(12) United States Patent
Jo et al.

(10) Patent No.: US 11,888,551 B2
(45) Date of Patent: Jan. 30, 2024

(54) OPTIMIZATION METHOD AND APPARATUS FOR EFFICIENT BEAM SYNTHESIS

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Donggeun Jo, Suwon-si (KR); Hyunsik Yoon, Suwon-si (KR); Kaewon Choi, Suwon-si (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 17/756,630

(22) PCT Filed: May 18, 2020

(86) PCT No.: PCT/KR2020/006485
§ 371 (c)(1),
(2) Date: May 27, 2022

(87) PCT Pub. No.: WO2021/107299
PCT Pub. Date: Jun. 3, 2021

(65) Prior Publication Data
US 2022/0416847 A1 Dec. 29, 2022

(30) Foreign Application Priority Data
Nov. 29, 2019 (KR) .................. 10-2019-0156866

(51) Int. Cl.
*H04B 7/0408* (2017.01)
*H04B 7/0426* (2017.01)
*H04B 7/06* (2006.01)

(52) U.S. Cl.
CPC .......... *H04B 7/0408* (2013.01); *H04B 7/043* (2013.01); *H04B 7/0617* (2013.01)

(58) Field of Classification Search
CPC .... H04B 7/0408; H04B 7/043; H04B 7/0617; H04B 7/0426; H04B 7/10
See application file for complete search history.

(56) References Cited

U.S. PATENT DOCUMENTS 7,239,276 B1 7/2007 Bonanni
10,027,036 B2 7/2018 Schmidt et al.
(Continued)

FOREIGN PATENT DOCUMENTS

JP 2007060045 A 3/2007
KR 20100109761 A 10/2010
(Continued)

OTHER PUBLICATIONS

Machine translation of CN-107888241-A. (Year: 2023).*
(Continued)

*Primary Examiner* — Jean B Corrielus

(57) ABSTRACT

Disclosed are a communication technique which merges, with IoT technology, a 5G communication system for supporting a data transmission rate higher than that of a 4G system, and a system therefor. The present disclosure can be applied to intelligent services (for example, smart homes, smart buildings, smart cities, smart cars or connected cars, healthcare, digital education, retail, security- and safety-related services, and the like) on the basis of 5G communication technology and IoT-related technology. A beam forming method for an array antenna, according to one embodiment of the present disclosure, can comprise the steps of: setting a first area and a second area for beam formation; calculating a first directivity function corresponding to the first area and a second directivity function corresponding to the second area; setting an objective func-
(Continued)

tion on the basis of the first directivity function and the second directivity function; determining a feed coefficient of the array antenna on the basis of the objective function; and forming a beam on the basis of the determined feed coefficient.

15 Claims, 19 Drawing Sheets

(56) References Cited

U.S. PATENT DOCUMENTS

| | | | |
|---|---|---|---|
| 11,018,440 | B2 | 5/2021 | Hong |
| 2016/0112112 | A1 | 4/2016 | Lee et al. |
| 2016/0190707 | A1 | 6/2016 | Park et al. |
| 2019/0068264 | A1* | 2/2019 | Agrawal ............ H04W 72/046 |
| 2019/0181920 | A1* | 6/2019 | Rofougaran ........... H01Q 15/16 |
| 2020/0274593 | A1* | 8/2020 | Kim ..................... H04W 16/28 |
| 2021/0067216 | A1 | 3/2021 | Jeong et al. |

FOREIGN PATENT DOCUMENTS

| | | |
|---|---|---|
| KR | 20160046228 A | 4/2016 |
| KR | 20160080044 A | 7/2016 |
| KR | 101693661 B1 | 1/2017 |
| KR | 20190105732 A | 9/2019 |
| KR | 20190106949 A | 9/2019 |
| WO | 2012101282 A1 | 8/2012 |

OTHER PUBLICATIONS

International Search Report and Written Opinion of the International Searching Authority in connection with International Application No. PCT/KR2020/006485 dated Aug. 20, 2020, 11 pages.
Korean Intellectual Property Office, "Office Action," dated Dec. 10, 2021, in connection with Korean Patent Application No. 10-2019-0156866, 10 pages.

* cited by examiner

OPTIMIZATION METHOD AND APPARATUS FOR EFFICIENT BEAM SYNTHESIS

CROSS-REFERENCE TO RELATED APPLICATIONS

This application is a 371 of International Application No. PCT/KR2020/006485, filed May 18, 2020, which claims priority to Korean Patent Application No. 10-2019-0156866, filed Nov. 29, 2019, the disclosures of which are herein incorporated by reference in their entirety.

BACKGROUND

1. Field

The disclosure relates to an optimization method and apparatus for efficient beam synthesis.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a beyond 4G network communication system or a post long term evolution (post LTE) system. The 5G communication system is considered to be implemented in higher frequency (mmWave) bands (e.g., 28 GHz bands) to accomplish higher data rates. In order to decrease propagation loss of radio waves and increase a transmission distance, the beamforming, massive multiple-input multiple-output (MIMO), full dimensional MIMO (FD-MIMO), array antenna, an analog beamforming, and large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as sensing technology, wired/wireless communication and network infrastructure, service interface technology, and security technology, have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine to machine (M2M) communication, and machine type communication (MTC) may be implemented by beamforming, MIMO, and array antennas. Application of a cloud radio access network (cloud RAN) as the above-described Big Data processing technology may also be considered to be as an example of convergence between the 5G technology and the IoT technology.

Meanwhile, in a communication system using beamforming, a beam alignment process is essential, and the overhead of this process is significant. In case of A6G (more than 6 GHz), more than 1000 beams are used. In order to satisfy various requirements of 5G, an efficient beam alignment method is required in each scenario, and the beam should be electrically steered. In the direction of a terminal belonging to a cell, interference should be minimized through nullification. That is, there is a need for a beamforming technology that quickly finds a possible terminal device, aligns beams to start communication, tracks movement well, and quickly recovers when a communication link is broken due to ambient conditions.

SUMMARY

In general, a mobile communication system is subject to many restrictions. For example, according to the 5G NR standard used as a reference, the number of SS burst sets that contain beam information for initial access is limited. Proposed is a beam synthesizing method that can be effectively used in communication systems with many limitations as above.

The technical problems to be achieved in the disclosure are not limited to the above-mentioned problems, and other technical problems not mentioned are clearly understood from the following description by a person skilled in the art to which the disclosure belongs.

In order to achieve the above-mentioned technical problems, a method for forming a beam of an antenna array according to an embodiment of the disclosure may include configuring a first region and a second region for beam forming; calculating a first directivity function corresponding to the first region and a second directivity function corresponding to the second region; configuring an objective function based on the first directivity function and the second directivity function; determining a feeding coefficient of the antenna array based on the objective function; and forming and transmitting a beam based on the determined feeding coefficient.

In addition, an apparatus for forming a beam of an antenna array according to an embodiment of the disclosure may include a transceiver; and a controller configured to set up a first region and a second region for beam forming, to calculate a first directivity function corresponding to the first region and a second directivity function corresponding to the second region, to configure an objective function based on the first directivity function and the second directivity function, to determine a feeding coefficient of the antenna array based on the objective function, and to form and transmit a beam based on the determined feeding coefficient.

According to the disclosure, it is possible to form a desired beam by designating only a direction to send a beam without modeling a beam pattern to be formed.

Also, it is possible to create and radiate various types of beams according to a desired area, such as multi-beam, wide beam, and comb beam, which are useful in various scenarios of 5G mobile communication.

In addition, various effects explicitly or implicitly appreciated through the disclosure may be provided.

DETAILED DESCRIPTION

Figure 1:
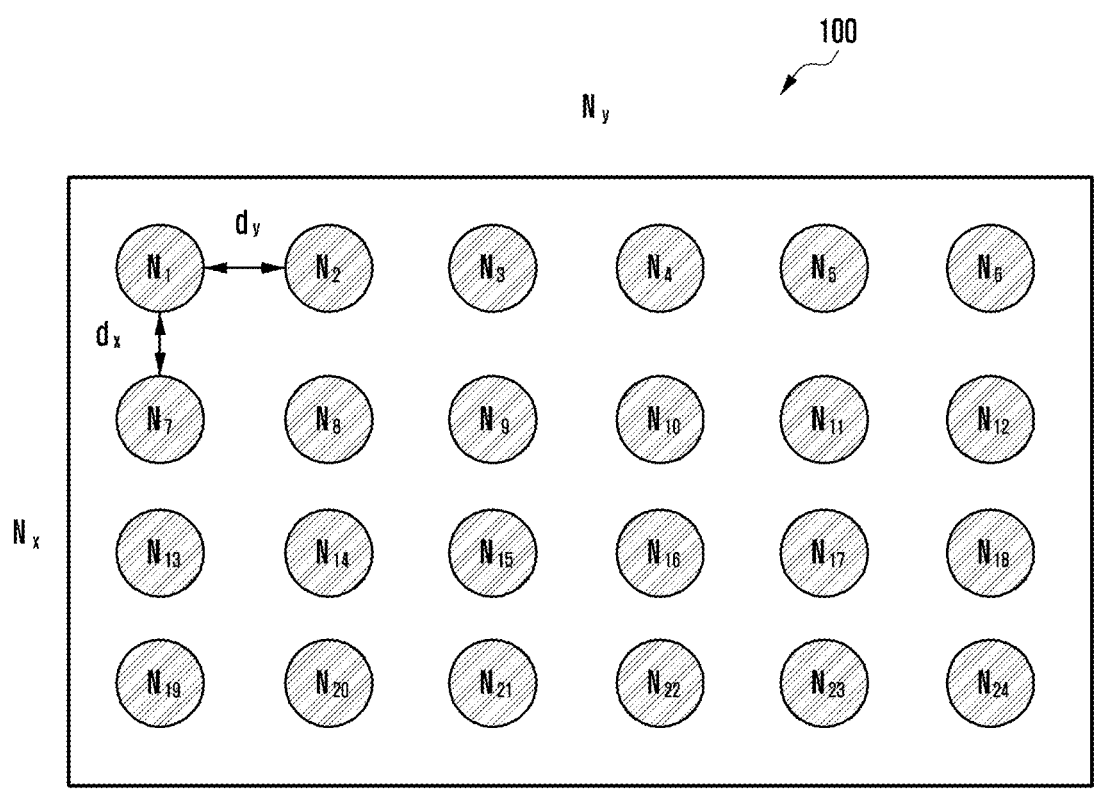
FIG. 1 is a diagram illustrating a structure of an antenna array according to an embodiment of the disclosure.

Hereinafter, embodiments of the disclosure will be described in detail with reference to the accompanying drawings. In describing embodiments, descriptions of technical contents that are well known in the technical field to which the disclosure pertains and are not directly related to the disclosure will be omitted. This is to more clearly convey the subject matter of the disclosure without obscuring it by omitting unnecessary description.

For the same reason, some elements are exaggerated, omitted, or schematically illustrated in the accompanying drawings. In addition, the depicted size of each element does not fully reflect the actual size. In the drawings, the same or corresponding elements are assigned the same reference numerals.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. Throughout the specification, the same reference numerals refer to the same constitutional elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card. Also, in embodiments, "unit" may include one or more processors.

In the following description, terms referring to signals, terms referring to channels, terms referring to control information, terms referring to network entities, terms referring to components of a device, terms for identifying access nodes, terms referring to messages, terms referring to interfaces between network objects, terms referring to various kinds of identification information, and the like are exemplified for convenience of description. Thus, the disclosure is not limited to the terms described below, and other terms referring to objects having equivalent technical meanings may be used.

Figure 2:
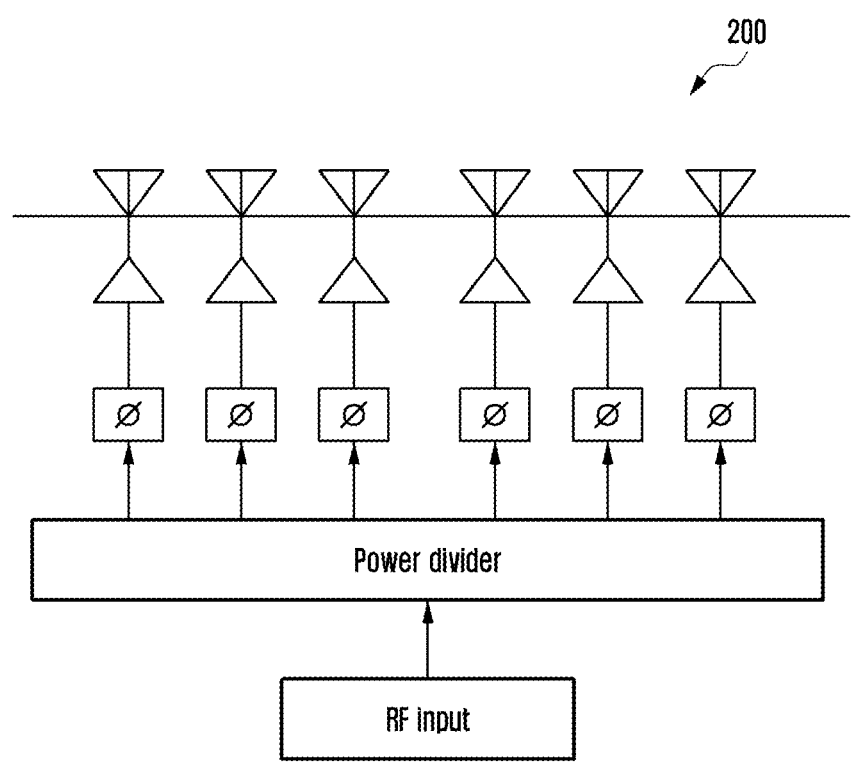
FIG. 2 is a diagram illustrating a circuit structure of an antenna array according to an embodiment of the disclosure.

FIG. 1 is a diagram illustrating a structure of an antenna array according to an embodiment of the disclosure, and FIG. 2 is a diagram illustrating a circuit structure of an antenna array according to an embodiment of the disclosure.

FIG. 1 illustrates the structure of a planar antenna array arranged orthogonally along the x and y axes in two dimensions for explanation, but this is only for convenience of description and does not limit the scope of the disclosure.

In FIG. 1, with Nx (Nx=4 in FIG. 1) along the x-axis and Ny (Ny=6 in FIG. 1) along the y-axis, a total of N (N=24 in FIG. 1) planar array antennas are shown. According to an embodiment, the Nx antennas arranged along the x-axis may be disposed at a distance of dx, and arranged along the y-axis may be disposed at a distance of dy. In FIG. 1, for explanation, the distances dx and dy between the antennas arranged along the x and y axes are shown to be equal, but this is exemplary only and different distances dx(i) and dy(i) between the antennas are possible. In the antenna array structure shown in FIG. 1, a position vector ln of the antenna can be expressed as in Equation 1 below.

$$\begin{cases} l_n = (d_x(n_x - 1), d_y(n_y - 1), 0)^T \\ n_x = ((n - 1) \bmod N_y) + 1 \\ n_y = \lfloor (n - 1)/N_x \rfloor + 1 \end{cases}$$ [Equation 1]

Meanwhile, a feeding coefficient x of the antenna array can be expressed as Equation 2 below.

$$\begin{cases} x = (x_1, \ldots, x_n)^T \\ x_k = m_k \exp(jP_k) \end{cases}$$ [Equation 2]

Here, xk denotes a feeding coefficient of each k-th antenna (index=k), mk denotes a magnitude of a feeding current corresponding to the k-th antenna, and Pk denotes a phase corresponding to the k-th antenna. That is, the feeding coefficient corresponding to each antenna constituting the antenna array can be expressed as a complex number indicating the magnitude and phase of the feeding current of the antenna, and the feeding coefficient x of the entire antenna array can be expressed as a vector consisting of the feed coefficients of the individual antennas.

According to an embodiment, a parameter included in the position vector ln of the antenna may be configured by physical parameters constituting the antenna array as shown in FIG. 1, and these physical parameters may include the number of single elements (single antennas) included in the antenna array, the array distances dx and dy, and an operating frequency band. In addition, the magnitude and phase values of the feeding current included in the feeding coefficient x according to an embodiment may be controlled by a circuit constituting the antenna array as shown in FIG. 2.

Hereinafter, through various embodiments of the disclosure, a method for determining an appropriate feeding coefficient x of an antenna array for forming a desired beam pattern, that is, a method for determining the magnitude mn and phase Pk of a feeding current corresponding to each antenna of the antenna array will be described. In the description of the disclosure, a beam may be understood to mean a signal having directivity generated by an arbitrary signal transmission means.

A typical method for forming a beam of an antenna array performs modeling of a pattern corresponding to a beam pattern to be formed and then performs optimization so that a beam pattern according to a specific coefficient approaches the modeling pattern. However, this method can be used limitedly only when the beam pattern to be formed allows mathematical modeling, and there is a problem of requiring a considerably large amount of calculation because of having to reduce errors by performing calculations at all sampled points in each function.

Hereinafter, in the disclosure, a method for forming a beam of a desired pattern based on an azimuth angle (θ) and elevation angle (φ) corresponding to a region to increase beam intensity or region to decrease beam intensity without modeling a desired beam pattern in advance is proposed.

According to an embodiment, the radiant energy formed in space by the antenna array having the antenna array structure according to Equation 1 and Equation 2 described above may be formed as a product of a radiation pattern of a single antenna constituting the antenna array and array factor, AF that determines an arrangement characteristic.

The structure of the antenna array according to Equation 1 and the pattern function (AF) of the antenna array having the feeding coefficient x according to Equation 2 can be expressed as in Equation 3 below.

$$AF = \sum_{n=1}^{N} x_n \exp(jkl_n \cdot S(\theta, \phi))$$ [Equation 3]

$$= \sum_{n=1}^{N} x_n \exp(jk(d_x(n_x - 1)\sin\theta\cos\phi + d_y(n_y - 1)\sin\theta\sin\phi))$$

$$= \sum_{n=1}^{N} h_n(\theta, \phi) x_n$$

$$= h(\theta, \phi)^T x$$

-continued $$h_n(\theta, \phi) = \exp(jkl_n \cdot S(\theta, \phi))$$

$$h(\theta, \phi) = (h_1(\theta, \phi), \ldots, h_n(\theta, \phi))^T$$

$$k = 2\pi/\lambda$$

$$S(\theta, \phi) = (\sin\theta\cos\phi, \sin\theta\sin\phi, \cos\theta)^T$$

In Equation 3, (θ, φ) is a parameter representing the radial direction (azimuth angle, elevation angle) in the spherical coordinate system, and S(θ, φ) denotes a unit vector with respect to the (θ, φ) radial direction.

According to an embodiment of the disclosure, a directivity function for a specific direction or region may be defined based on the pattern function calculated by Equation 3. The directivity function according to an embodiment of the disclosure may be defined as a ratio of a radiation intensity in a specific direction to an average radiation intensity in all directions.

According to an embodiment, the directivity function with respect to the (θ, φ) direction of the antenna array having the position vector ln of the antenna and the feeding coefficient x may be expressed as follows.

$$D(\theta, \phi:x) = \frac{4\pi[AF(\theta, \phi)]^2}{\int_0^{2\pi}\int_0^{\pi}[AF(\theta, \phi)]^2\sin\theta d\theta d\phi} \quad [\text{Equation 4}]$$

$$= \frac{x^H h(\theta, \phi)^* h(\theta, \phi)^T x}{x^H \frac{1}{4\pi}\left(\int_0^{2\pi}\int_0^{\pi} h(\theta, \phi)^* h(\theta, \phi)^T \sin\theta d\theta d\phi\right) x}$$

$$= \frac{x^H H(\theta, \phi) x}{x^H \Phi x}$$

$$H(\theta, \phi) = h(\theta, \phi)^* h(\theta, \phi)^T$$

$$\Phi = \frac{1}{4\pi}\int_0^{2\pi}\int_0^{\pi} h(\theta, \phi)^* h(\theta, \phi)^T \sin\theta d\theta d\phi$$

The method for forming a beam of an antenna array according to an embodiment of the disclosure may determine the value of the feeding coefficient to be applied to the antenna array through an optimization method of an objective function configured based on a directivity function and a variance function for a specific region defined based on a directivity function for a specific direction (θ, φ).

The objective function according to an embodiment of the disclosure may be configured based on a directivity function and a variance function for a region (the first region) in which the intensity of the beam is to be increased and a region (the second region) in which the intensity of the beam is to be decreased. According to an embodiment, the first and second regions may be configured based on a specific geographic location, configured as a region corresponding to a specific direction in a virtual space configured in an arbitrary shape (e.g., a spherical surface), or configured as a specific direction itself. This is, however, exemplary only, and the first and second regions may be configured in various methods as needed.

According to an embodiment, the objective function may be configured based on the directivity function or the variance function for the region (the first region) in which the intensity of the beam is to be increased and the region (the second region) in which the intensity of the beam is to be decreased, and the feeding coefficient to be applied to the antenna array may be determined through the optimization method of the objective function.

The objective function J(x) according to an embodiment of the disclosure may be expressed as Equation 5 below. In Equation 5, J(x), B(A:x), and V(A:x) are exemplary only and do not limit the scope of the disclosure. They may be modified within a range that can be commonly performed by a person skilled in the art, based on the following description of each element constituting the objective function.

$$J(x) = B(\mathcal{A}^+:x) - B(\mathcal{A}^-:x) - \lambda\left(V(\mathcal{A}^+:x) + V(\mathcal{A}^-:x)\right) \quad [\text{Equation 5}]$$

$$B(\mathcal{A}:x) = \frac{1}{|\mathcal{A}|}\int_{(\theta,\phi)\in\mathcal{A}} D(\theta, \phi:x)\sin\theta d\theta d\phi$$

$$V(\mathcal{A}:x) = \frac{1}{|\mathcal{A}|}\int_{(\theta,\phi)\in\mathcal{A}}(D(\theta, \phi:x) - B(\mathcal{A}:x))^2 \sin\theta d\theta d\phi$$

λ:weight

According to an embodiment, a desired value of the feeding coefficient (x) may be determined by determining the value of x which maximizes or minimizes the value of the objective function through the optimization method of the objective function.

According to an embodiment, A+ corresponds to the first region in which the intensity of the beam is to be increased, and A− corresponds to the second region in which the intensity of the beam is to be decreased. They may be configured based on an azimuth angle (θ) and elevation angle (φ) for the first and second regions. According to an embodiment, the first region (A+) or the second region (A−) may be configured based on a specific azimuth angle (θ) and a specific elevation angle (φ) or based on a range of azimuth angle (θ) and a range of elevation angle (φ). For example, the first region (A+) may be configured as a region corresponding to (θ=−45°, φ=90°), and the second region (A−) may be configured as a region corresponding to (θ=45°, (φ=90°). In this case, the objective function J(x) may be configured to increase the intensity of the beam in the (θ=−45°, φ=90°) direction and decrease the intensity of the beam in the (θ=45°, φ=90°) direction. In another example, the first region (A+) may be configured as a region corresponding to (θ=−45° ~−30°, φ=90°), and the second region (A−) may be configured as a region corresponding to (θ=30° ~45°, φ=90°). In this case, the objective function J(x) may be configured to increase the intensity of the beam in the (θ=−45° ~−30°, φ=90°) direction and decrease the intensity of the beam in the (θ=30° ~45°, φ=90°) direction. In addition, according to an embodiment, the first region (A+) or the second region (A−) may be a region corresponding to a combination of one or more regions configured as the specific azimuth angle (θ) and elevation angle (φ) or the specific range of azimuth angle (θ) and elevation angle (φ). According to the disclosure, by configuring the objective function using an azimuth angle (θ) and an elevation angle (φ) of an appropriate value or range and a combination thereof according to the beam pattern to be formed, it is possible to efficiently adjust the width of a beam formed in a specific direction and efficiently form beams according to various patterns.

According to an embodiment, B(A+:x) may denote a directivity function corresponding to the first region (A+), and B(A−:x) may denote a directivity function corresponding to the second region (A−). With reference to Equation 5, each of B(A+:x) and B(A−:x) may be defined as Equation 6 below.

$$B(\mathcal{A}^+:x) = \frac{1}{|\mathcal{A}^+|} \int_{(\theta,\phi)\in\mathcal{A}^+} D(\theta, \phi:x)\sin\theta d\theta d\phi \quad \text{[Equation 6]}$$

$$B(\mathcal{A}^-:x) = \frac{1}{|\mathcal{A}^-|} \int_{(\theta,\phi)\in\mathcal{A}^-} D(\theta, \phi:x)\sin\theta d\theta d\phi$$

$D(\theta,\varphi:x)$ represents the directivity with respect to the ($\theta$, $\varphi$) direction of the antenna array having the feeding coefficient x as described above. Thus, B(A+:x) may be a value obtained by normalizing the directivity in a direction corresponding to the first region of the antenna array having the feeding coefficient x, and B(A−:x) may be a value obtained by normalizing the directivity in a direction corresponding to the second region of the antenna array having the feeding coefficient x.

According to the above-described definitions of the first and second regions and corresponding B(A+:x) and B(A−:x), in constructing the objective function, B(A+:x) may be configured as a factor to increase its value, and B(A−:x) may be configured as a factor to decrease its value. Therefore, B(A+:x) and B(A−:x) constituting the objective function may be configured to have different signs. In Equation 5, for intuitive understanding, B(A+:x) for increasing the value is configured as a plus sign and B(A−:x) is configured as a minus sign. In this case, the desired feeding coefficient (x) may be determined through an optimization method for maximizing the objective function, but this is exemplary only, and the sign of each term may be configured oppositely depending on the method of constructing the objective function. In this case, it is possible to determine the desired feeding coefficient (x) through an optimization method for minimizing the objective function.

According to an embodiment, V(A+:x) may represent a variance function corresponding to the first region (A+), and V(A−:x) may represent a variance function corresponding to the second region (A−).

With reference to Equation 5, each of V(A+:x) and V(A−:x) may be defined as Equation 7 below.

$$V(\mathcal{A}^+:x) = \frac{1}{|\mathcal{A}^+|} \int_{(\theta,\phi)\in\mathcal{A}^+} (D(\theta, \phi:x) - B(\mathcal{A}^+:x))^2 \sin\theta d\theta d\phi \quad \text{[Equation 7]}$$

$$V(\mathcal{A}^-:x) = \frac{1}{|\mathcal{A}^-|} \int_{(\theta,\phi)\in\mathcal{A}^-} (D(\theta, \phi:x) - B(\mathcal{A}^-:x))^2 \sin\theta d\theta d\phi$$

$D(\theta,\varphi:x)$ represents the directivity with respect to the ($\theta$, $\varphi$) direction of the antenna array having the feeding coefficient x. Also, B(A+:x) may be a value obtained by normalizing the directivity in a direction corresponding to the first region of the antenna array having the feeding coefficient x, and B(A−:x) may be a value obtained by normalizing the directivity in a direction corresponding to the second region of the antenna array having the feeding coefficient x. Thus, V(A+:x) may represent the variance of directivity in a direction corresponding to the first region (A+), and V(A−:x) may represent the variance of directivity in a direction corresponding to the second region (A−).

According to an embodiment of the disclosure, when the first region (A+) and the second region (A−) correspond to a plurality of elevation angles ($\theta$) and azimuth angles ($\varphi$) or are configured in ranges of elevation angles ($\theta$) and azimuth angles ($\varphi$), the beam forming within each region may not be uniform.

Accordingly, V(A+:x) and V(A−:x) representing the variance of directivity in the directions corresponding to respective region may be configured as factors of reducing the value in constructing the objective function. Thus, V(A+:x) and V(A−:x) according to an embodiment may be configured to have a different sign from B(A+:x) and the same sign as B(A−:x) in the objective function.

As described above through Equation 5 to Equation 7, the method for forming a beam of an antenna array according to an embodiment of the disclosure may configure an appropriate objective function so as to increase the directivity to the region (first region) for increasing the beam intensity, reduce the directivity to the region (second region) for reducing the beam intensity, and reduce the variance to the first and second regions, and then determine a desired feeding coefficient (x) through optimization of the configured objective function.

The method for optimizing the objective function according to an embodiment of the disclosure may include a gradient method. The gradient method may refer to a method for determining a variable value corresponding to the maximum or minimum value of a given function by continuously updating the variable in a direction of decreasing or increasing the gradient of the function from an arbitrarily set initial variable value. According to an embodiment, the gradient method may include a gradient descent method to find the minimum value of the objective function by updating the variable value in a direction of decreasing the gradient, or a gradient ascent method to find the maximum value of the objective function by updating the variable value in a direction of increasing the gradient. The gradient method according to an embodiment of the disclosure is exemplary only and does not limit the embodiment of the disclosure, and any other method may also be used for optimization of the objective function.

With reference to Equation 5 described above, the objective function according to an embodiment of the disclosure may be expressed as follows.

$$J(x) = B(\mathcal{A}^+:x) - B(\mathcal{A}^-:x) - \lambda(V(\mathcal{A}^+:x) + V(\mathcal{A}^-:x))$$

$$B(\mathcal{A}:x) = \frac{1}{|\mathcal{A}|} \int_{(\theta,\phi)\in\mathcal{A}} D(\theta, \phi:x)\sin\theta d\theta d\phi$$

$$V(\mathcal{A}:x) = \frac{1}{|\mathcal{A}|} \int_{(\theta,\phi)\in\mathcal{A}} (D(\theta, \phi:x) - B(\mathcal{A}:x))^2 \sin\theta d\theta d\phi$$

$\lambda$:weight

In the above, B(A+:x) may denote a directivity function corresponding to the first region (A+), and B(A−:x) may denote a directivity function corresponding to the second region (A−). Also, V(A+:x) may denote a variance function corresponding to the first region (A+), and V(A−:x) may denote a variance function corresponding to the second region (A−).

As described above, the objective function J(x) according to the embodiment of Equation 5 of the disclosure may be configured to increase the directivity to the region (the first region) for increasing the beam intensity, decrease the directivity to the region (the second region) for decreasing the beam intensity, and decrease the variance to the first and second regions. The optimization of the objective function according to an embodiment of the disclosure may be to determine the feeding coefficient (x) having J(x) configured according to Equation 5 as the maximum value, that is, the magnitude m and phase P of a feeding current constituting the feeding coefficient.

Meanwhile, with reference to Equation 2, the feeding coefficient (x) according to an embodiment of the disclosure may be expressed as follows.

$$x = (x_1, \ldots, x_n)^T$$

$$x_k = m_k \exp(jP_k)$$

Here, xk denotes a feeding coefficient of each k-th antenna (index=k), mk denotes a magnitude of a feeding current corresponding to the k-th antenna, and Pk denotes a phase corresponding to the k-th antenna. That is, the feeding coefficient corresponding to each antenna constituting the antenna array can be expressed as a complex number indicating the magnitude and phase of the feeding current of the antenna, and the feeding coefficient x of the entire antenna array can be expressed as a vector consisting of the feed coefficients of the individual antennas.

According to an embodiment, the initial value (x(0)) of the feeding coefficient may be configured as follows for the optimization of the objective function using a gradient method.

$$x^{(0)} = (x_1^{(0)}, \ldots, x_n^{(0)})^T$$

According to an embodiment, from the configured initial value of the feeding coefficient, it is possible to update the magnitude m and phase P of the feeding current constituting the feeding coefficient through an algorithm according to Equation 8 below and calculate corresponding x(i+1).

$$m^{(i+1)} = m^{(i)} + \eta \nabla_m J|_{m=m^{(i)}, P=P^{(i)}}$$

$$P^{(i+1)} = P^{(i)} + \eta \nabla_m J|_{m=m^{(i)}, P=P^{(i)}}$$

η: learning rate [Equation 8]

According to an embodiment, $$\nabla_m J = \frac{\partial J}{\partial m}$$

denotes a gradient of the objective function (J(x)) with respect to m, and $$\nabla_P J = \frac{\partial J}{\partial P}$$

denotes a gradient of the objective function (J(x)) with respect to P.

In Equation 8, η (learning rate) denotes an interval of moving in a direction of increasing or decreasing the gradient in the optimization using the gradient method, and may be configured as an appropriate sign depending on which method of the gradient ascent method for finding the maximum value of the objective function or the gradient descent method for finding the minimum value of the objective function is applied.

The optimization is performed using the algorithm according to Equation 8 from the configured initial value x(0) of the feeding coefficient. If the algorithm performed for optimization satisfies a specific condition, the algorithm is stopped to output a result value. As such a stop condition according to an embodiment, at least one of conditions shown in Equation 9 below may be used.

[Equation 9]

$$\|x^{(i+1)} - x^{(i)}\| \leq \epsilon_1 \quad 1)$$

$$J(x^{(i+1)}) - J(x^{(i)}) \leq \epsilon_2 \quad 2)$$

$$\|\nabla J(x^{(i)})\|_\infty \leq \epsilon_3 \quad 3)$$

$$\text{if } J(x) \to 0, |f(x^{(i)})| \leq \epsilon_4 \quad 4)$$

According to an embodiment, x(i) satisfying the stop condition according to Equation 9 may be determined as the feeding coefficient x.

Figure 3:
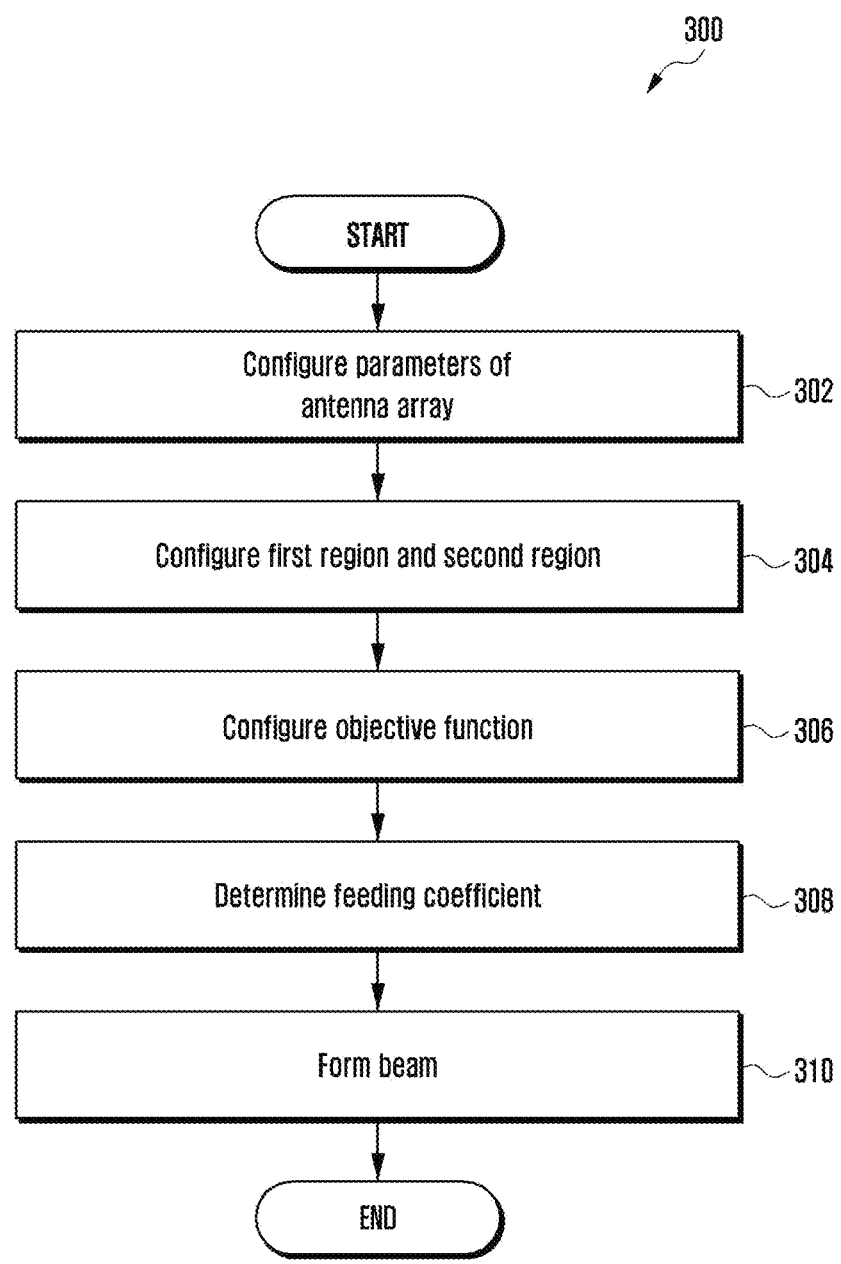
FIG. 3 is a flow diagram illustrating a method for forming a beam of an antenna array according to an embodiment of the disclosure.

FIG. 3 is a flow diagram illustrating a method for forming a beam of an antenna array according to an embodiment of the disclosure.

According to an embodiment, at step 302, physical parameters of the antenna array may be configured. The physical parameters of the antenna array according to an embodiment may include the number of single elements (single antennas) included in the antenna array, array distances (dx, dy), and an operating frequency band.

According to an embodiment, at step 304, a region (a first region) in which the intensity of the beam is to be increased and a region (a second region) in which the intensity of the beam is to be decreased may be configured. The first region and the second region may be configured based on a specific azimuth angle (θ) and a specific elevation angle (φ) corresponding to each region, a range of azimuth angle (θ) and a range of elevation angle (φ), or a combination thereof. Configuring the first and second regions has been described above, so a detailed description thereof will be omitted herein.

According to an embodiment, at step 306, an objective function may be configured, based on a position vector (ln) and a feeding coefficient (x) of the antenna array based on the parameters configured at the step 302 and directivity functions (B(A+:x), B(A−:x)) and variance functions (V(A+:x), V(A−:x)) corresponding to the first and second regions configured at the step 304. The above factors included in configuring the objective function at the step 306 has been described above, so a detailed description thereof will be omitted.

According to an embodiment, a value of the feeding coefficient (x) for forming a beam of a desired pattern may be determined at step 308 through an optimization method the configured objective function, and a beam may be formed at step 310 based on the determined value of the feeding coefficient and transmitted.

On the other hand, an initial access or initial beam alignment method using the beam forming method according to an embodiment of the disclosure is disclosed.

Normally, in order for a base station using beamforming to communicate with a UE, it is necessary to select an optimal beam for communication in an initial access step. In this case, an efficient beam forming method is required for the initial access to a moving object at a speed of 500 km/h required in scenarios such as 5G NR URLLC. In addition, because a link is highly likely to be broken in various obstacles due to the characteristics of high-frequency radio waves, a technique for rapid recovery is required. However, in a typical case, as the number of beams used by the base station increases (e.g., hundreds or thousands of beams are used), overhead inevitably occurs in the process of selecting the optimal beam, so that the initial access or initial beam alignment between the base station and the UE may be delayed.

The beam forming method according to an embodiment of the disclosure can enable the initial access between the base station and the UE with fewer attempts by efficiently adjusting the direction and width of the beam to be formed.

Figure 4:
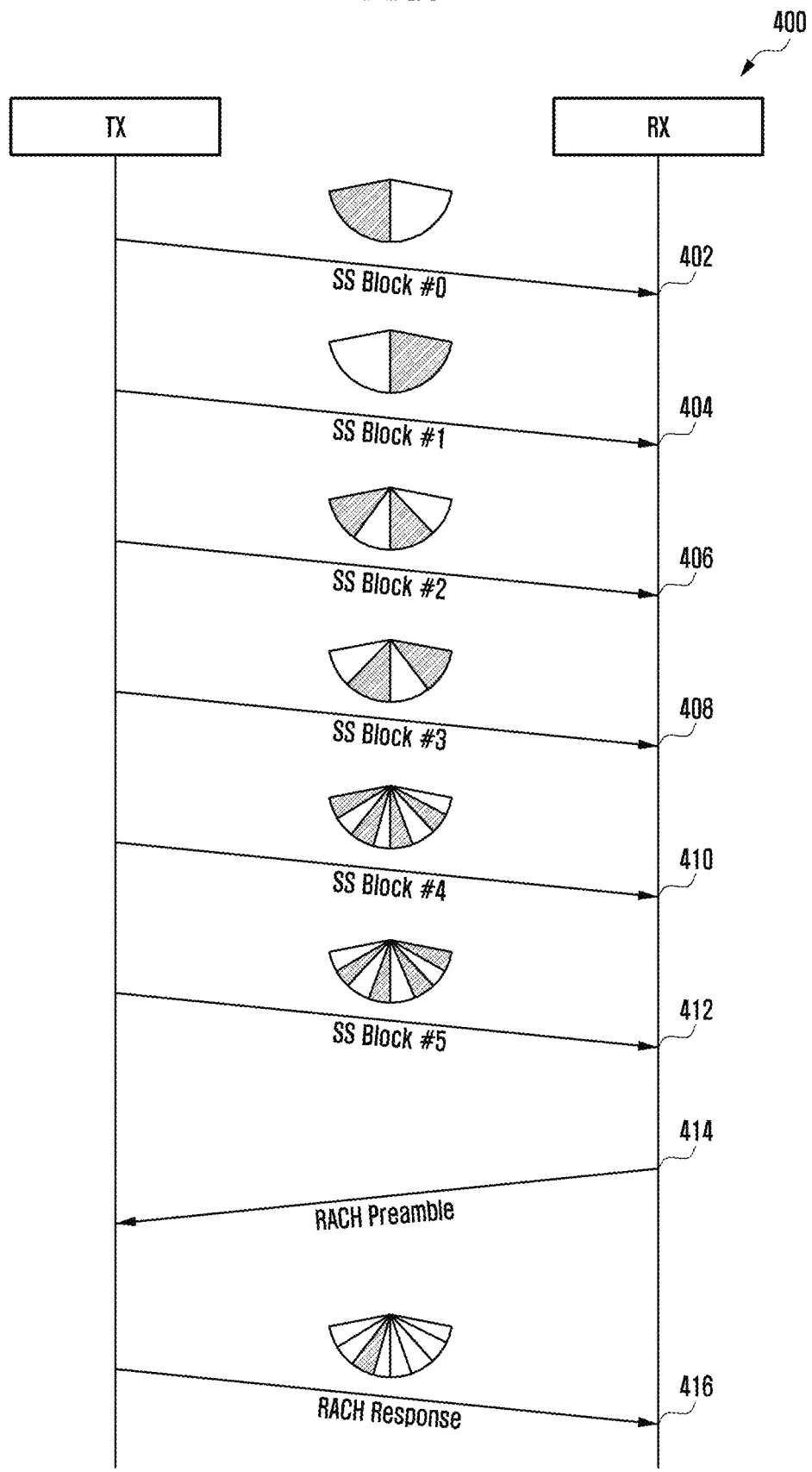
FIG. 4 is a diagram illustrating an initial access method based on a beam forming method according to an embodiment of the disclosure.

FIG. 4 is a diagram illustrating an initial access method based on a beam forming method according to an embodiment of the disclosure.

In FIG. 4, it will be described as an example that eight beams are operated for convenience of description, but this does not limit the scope of the disclosure.

With reference to FIG. 4, in the initial access method according to an embodiment of the disclosure, the entire region is first divided into two regions that do not overlap with each other, and a beam is formed for each region at steps 402 and 404. According to an embodiment, each of the two previously divided regions is divided again into two non-overlapping regions again (the entire region is divided into four regions), and beams are formed at steps 406 and 408 so as not to be identical to the beams formed at the steps 402 and 404 by respectively selecting two non-overlapping regions among the four regions. In the same way, each of the four divided regions is divided again into two non-overlapping regions (the entire region is divided into eight regions), and beams are formed at steps 410 and 412 so as not to be identical to the beams formed at the steps 402 to 408 by respectively selecting four non-overlapping regions. Through this method, an appropriate beam is selected from beams through which communication is made at the steps (402, 404), (406, 408), and (410, 412) among eight beams being operated, and thus the initial access between the base station and the UE may be performed. For example, in FIG. 4, communication between the base station and the UE may be performed at the steps 402, 408, and 410, and in this case, one beam formed by overlapping the steps 402, 408, and 410 may be selected at step 416. According to this method, when N=2 k beams are operated, an appropriate beam for communication between the base station and the UE may be selected through beam forming 2 log 2N=2 k times.

Figure 5:
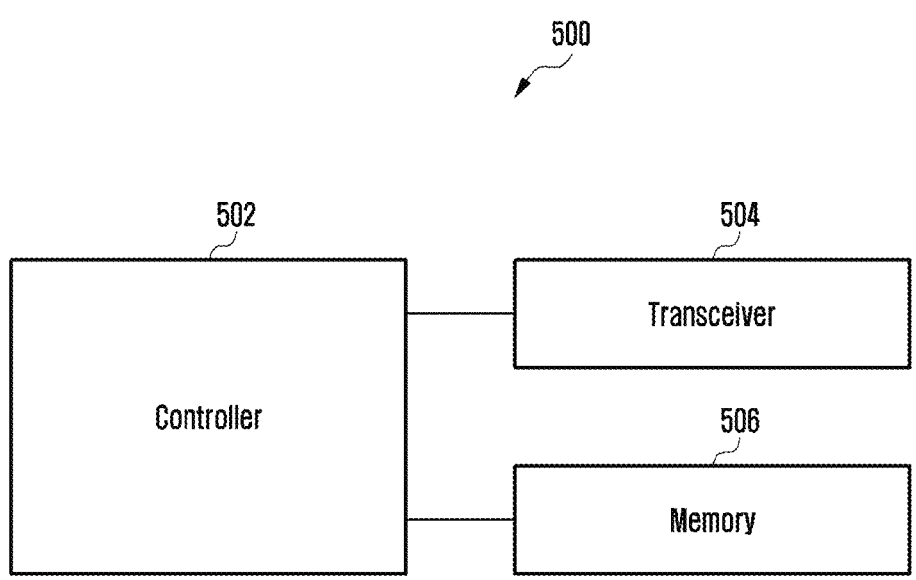
FIG. 5 is a diagram illustrating the constitution of an apparatus for forming a beam of an antenna array according to an embodiment of the disclosure.

FIG. 5 is a diagram illustrating the constitution of an apparatus 500 for forming a beam of an antenna array according to an embodiment of the disclosure.

The apparatus 500 according to an embodiment of the disclosure may be, for example, a base station, a user equipment (UE), or a device provided in the base station and the UE, but this does not limit embodiments of the disclosure. Any means for performing the above-described embodiment may be included.

With reference to FIG. 5, the apparatus 500 according to an embodiment of the disclosure may include a controller 502, a transceiver 504, and a memory 506. However, the components of the apparatus 500 are not limited to the above-mentioned example. For example, the apparatus 500 may include more or fewer components than those described above.

According to an embodiment of the disclosure, the controller 502 may control a series of operations and processes that enable the apparatus 500 to operate in accordance with the above-described embodiments of the disclosure. For example, the apparatus 500 may perform a series of operations of configuring a region (a first region) for increasing the intensity of a beam and a region (a second region) for decreasing the intensity of a beam, configuring an objective function based on a directivity function and a variance function corresponding to the regions, and determining an appropriate feeding coefficient by performing optimization on the configured objective function. In addition, the controller 502 according to an embodiment of the disclosure may control the transceiver 504 and the memory 506 such that the transceiver 504 and the memory 506 perform necessary operations in accordance with the above-described embodiments of the disclosure.

According to an embodiment of the disclosure, the transceiver 504 may transmit/receive signals to/from an external device, for example, a UE, and may be configured with various types of antenna array according to the above-described embodiments.

According to an embodiment of the disclosure, the memory 506 may store programs and data necessary for the operation of the device 500. The memory 506 may be implemented with a storage medium such as ROM, RAM, hard disk, CD-ROM, and DVD or a combination of storage media. In addition, the memory 506 may be composed of a plurality of memories.

Hereinafter, various embodiments based on a method for forming a beam of an antenna array according to an embodiment of the disclosure will be described with reference to the drawings.

FIGS. 6A to 11B show beams synthesized in various forms, based on a beam forming method of an antenna array according to an embodiment of the disclosure.

Figure 6A:
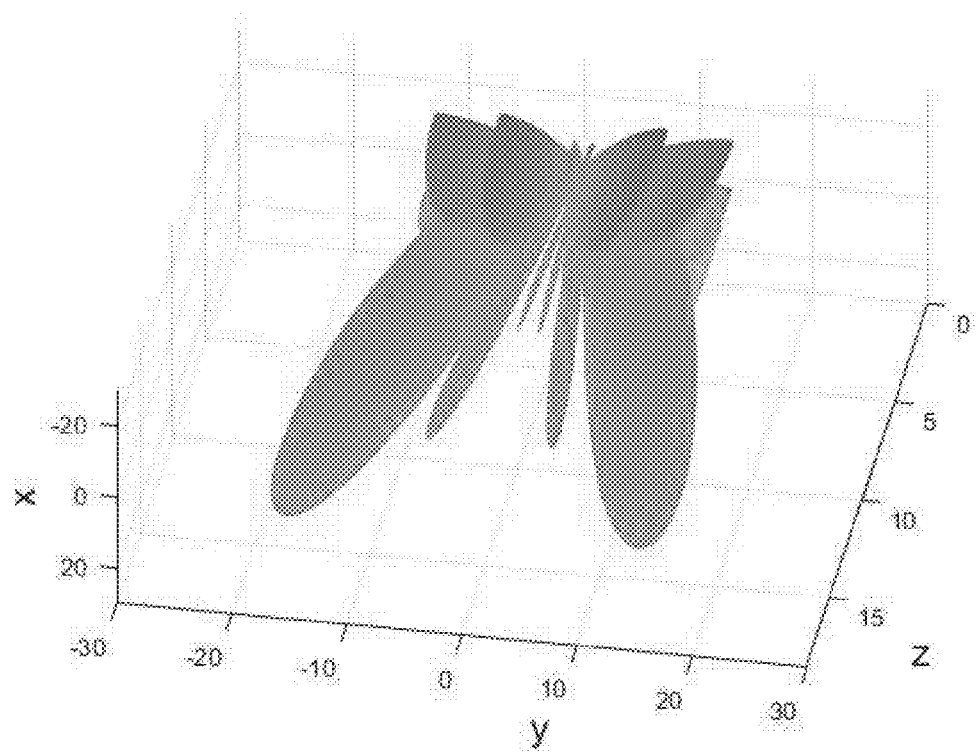
FIG. 6A is a diagram illustrating a double beam 3D radiation pattern of the beam forming method according to an embodiment of the disclosure.
Figure 6B:
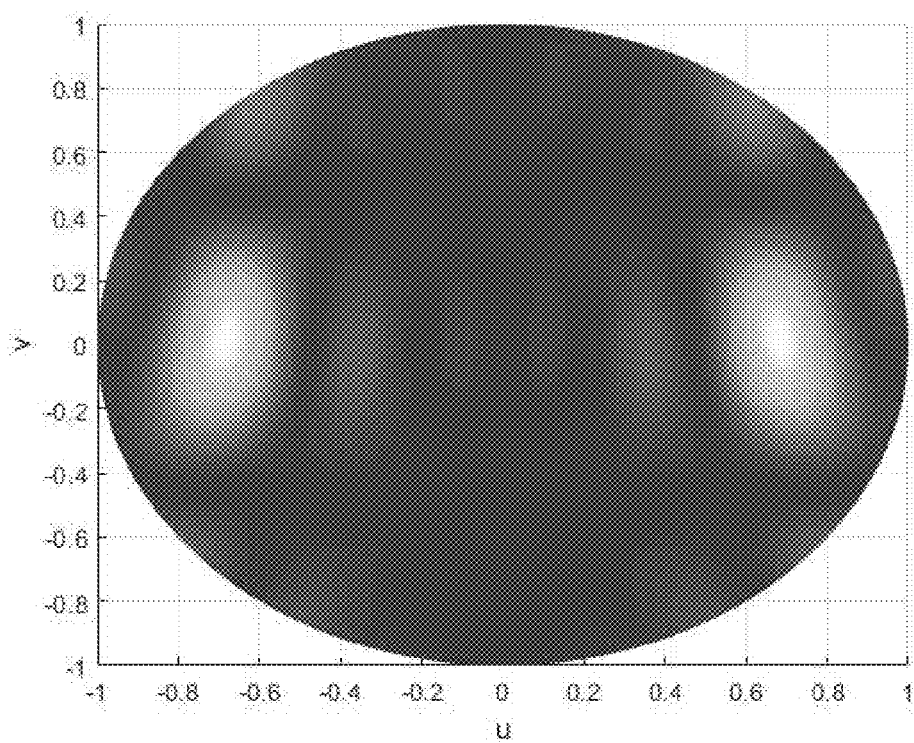
FIG. 6B is a diagram illustrating a double beam UV radiation pattern of the beam forming method according to an embodiment of the disclosure.

FIG. 6A is a diagram illustrating a double beam 3D radiation pattern of the beam forming method according to an embodiment of the disclosure, and FIG. 6B is a diagram illustrating a double beam UV radiation pattern of the beam forming method according to an embodiment of the disclosure.

According to the above-described embodiment, beams are configured to be simultaneously maximized in directions of ($\theta$=−45°, $\varphi$=90°) and ($\theta$=45°, $\varphi$=90°) in a 4×8 planar antenna array, and a completed result of optimization is as follows. Wanted position refers to position information configured for maximization, and Directivity indicates the degree of directivity in the position information. Best_cost is the result value of the objective function of the proposed optimization. Optimized phase indicates a phase result value with optimization completed.

M(x-axis): 4, N(y-axis): 8,
wanted position 1: −45, 90 (theta,phi), Directivity: 1.717636e+01
wanted position 2: 45, 90 (theta,phi), Directivity: 1.717713e+01
best_cost: 3.435099e+01

TABLE 1

| Optimized Phase of Double Beam Radiation Pattern | | | | | | | |
|---|---|---|---|---|---|---|---|
| 262.6 | 97.14 | 348.2 | 222.9 | 60.54 | 219.5 | 328.8 | 108.1 |
| 229.9 | 39.19 | 162.4 | 300.3 | 100.4 | 305.9 | 174.8 | 22.64 |
| 276.2 | 107 | 344 | 205.9 | 45.7 | 200.1 | 331 | 123.3 |
| 243.5 | 49 | 158.2 | 283.3 | 85.53 | 286.5 | 177 | 37.85 |

Blocks constituting Table 1 correspond to the phase values of single elements of the 4×8 antenna array, and may be interpreted similarly in other examples below. In this embodiment, only the phase value of the antenna array is exemplarily described for convenience, but the value of the feeding current may also be calculated in the same way according to the above-described embodiment. This may be interpreted similarly in other examples below.

Figure 7A:
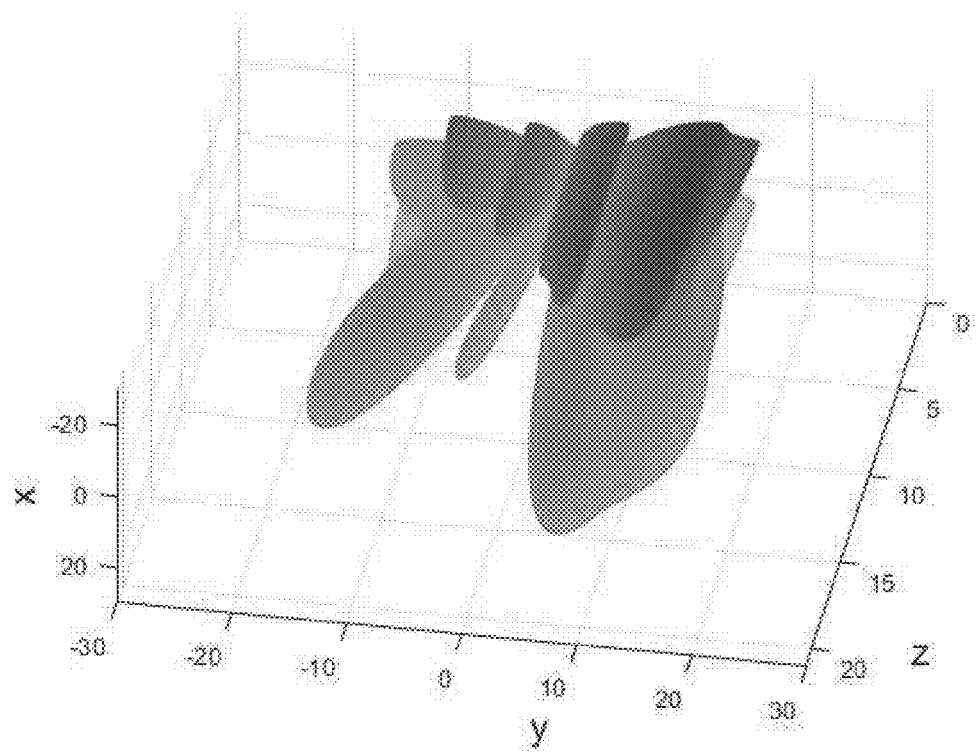
FIG. 7A is a diagram illustrating a wide beam 3D radiation pattern of the beam forming method according to an embodiment of the disclosure.
Figure 7B:
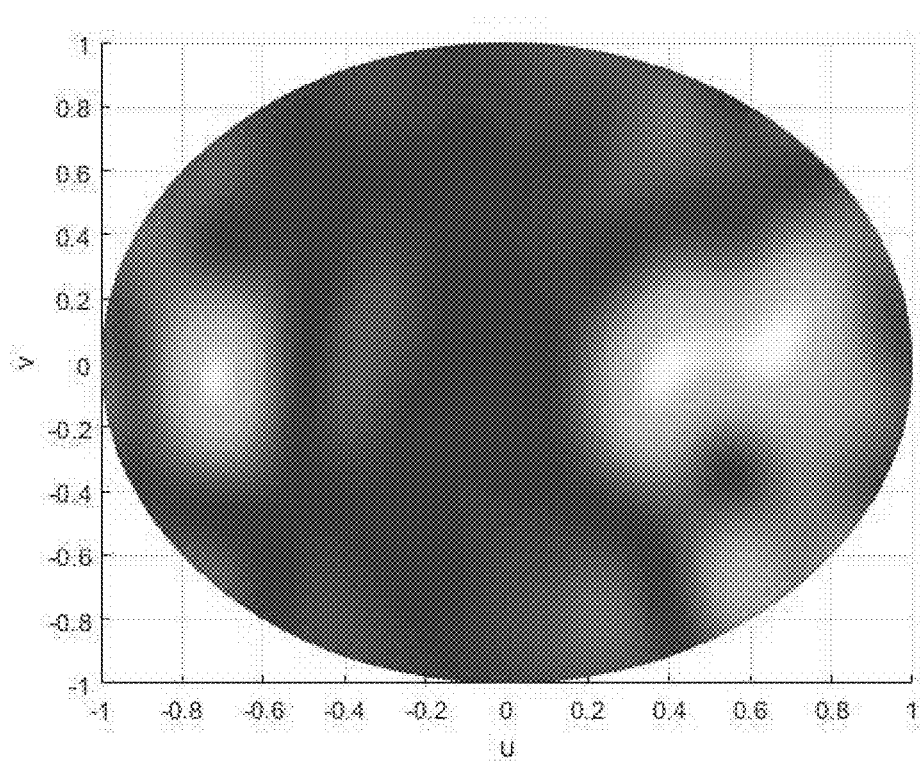
FIG. 7B is a diagram illustrating a wide beam UV radiation pattern of the beam forming method according to an embodiment of the disclosure.

FIG. 7A is a diagram illustrating a wide beam 3D radiation pattern of the beam forming method according to an embodiment of the disclosure, and FIG. 7B is a diagram illustrating a wide beam UV radiation pattern of the beam forming method according to an embodiment of the disclosure.

According to the above-described embodiment, beams are configured to be simultaneously maximized in directions of (θ=−45°, (φ=90°) and (θ=20° ~45°, φ=90°) in a 4×8 planar antenna array, and a completed result of optimization is as follows.

M(x-axis): 4, N(y-axis): 8,
wanted position 1: −45, 90 (theta,phi), Directivity: 7.258155e+00
wanted position 2: 20, 90 (theta,phi), Directivity: 6.683556e+00
wanted position 3: 25, 90 (theta,phi), Directivity: 7.447546e+00
wanted position 4: 30, 90 (theta,phi), Directivity: 6.923581e+00
wanted position 5: 35, 90 (theta,phi), Directivity: 7.079888e+00
wanted position 6: 40, 90 (theta,phi), Directivity: 7.397441e+00
wanted position 7: 45, 90 (theta,phi), Directivity: 6.815939e+00
best_cost: 4.932506e+01

TABLE 2

Optimized Phase of Wide Beam Radiation Pattern

| 40.4 | 232 | 37.84 | 201.7 | 333.7 | 203.6 | 140.5 | 3.096 |
|---|---|---|---|---|---|---|---|
| 167.4 | 35.79 | 313.3 | 116.9 | 312.2 | 185.3 | 144.4 | 0.299 |
| 280.1 | 171.7 | 12.71 | 186.9 | 330.6 | 201 | 138.6 | 1.927 |
| 127.8 | 315.2 | 78.71 | 9.806 | 310.2 | 194 | 145.9 | 2.784 |

Figure 8A:
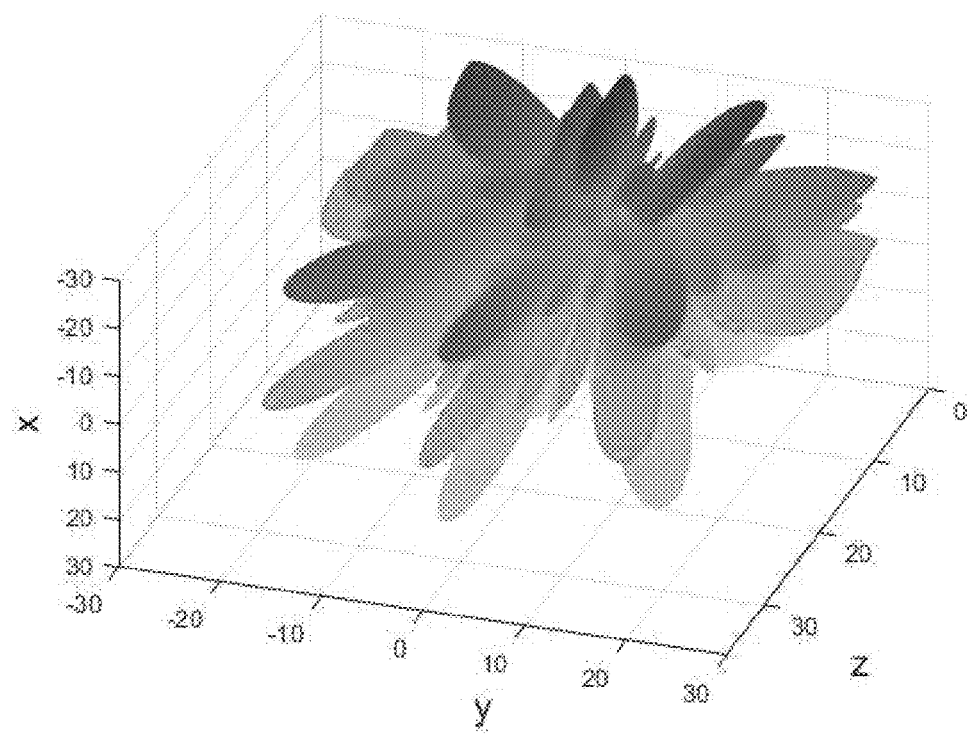
FIG. 8A is a diagram illustrating a multi beam 3D radiation pattern of the beam forming method according to an embodiment of the disclosure.
Figure 8B:
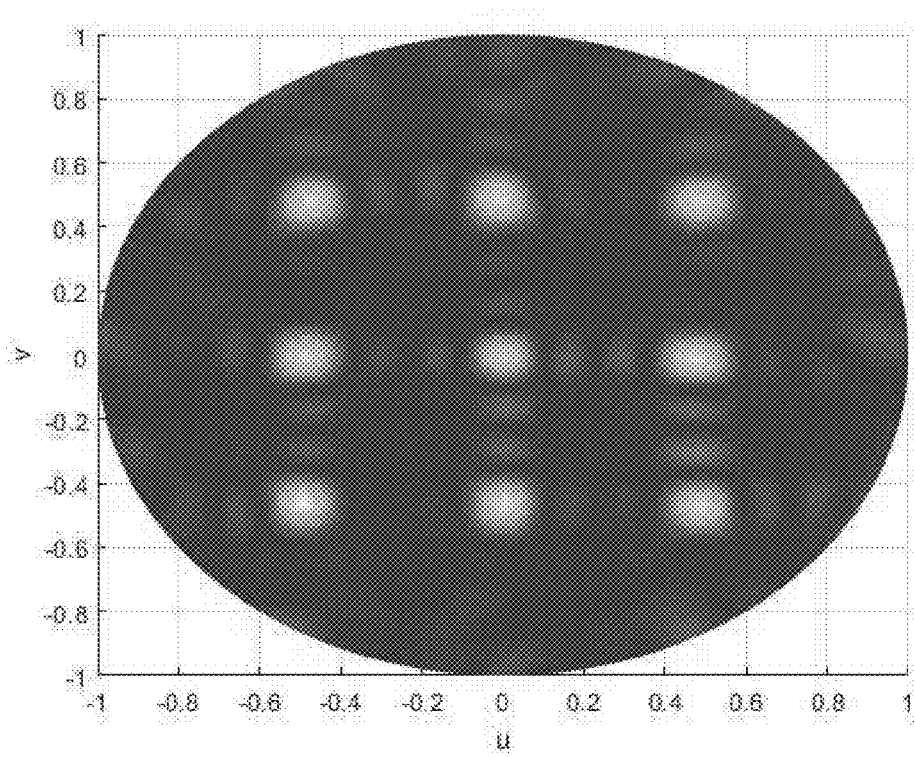
FIG. 8B is a diagram illustrating a multi beam UV radiation pattern of the beam forming method according to an embodiment of the disclosure.

FIG. 8A is a diagram illustrating a multi beam 3D radiation pattern of the beam forming method according to an embodiment of the disclosure, and FIG. 8B is a diagram illustrating a multi beam UV radiation pattern of the beam forming method according to an embodiment of the disclosure.

According to the above-described embodiment, beams are configured to be maximized in directions of (θ=45°, φ=45°), (θ=45°, φ=135°), (θ=45°, φ=−45°), (θ=45°, φ=−135°), (θ=30°, φ=0°), (θ=30°, φ=90°), (θ=30°, φ=180°), (θ=30°, φ=−90°), and (θ=0°, φ=0°) in a 16×16 planar antenna array, and a completed result of optimization is as follows.

M(x-axis): 16, N(y-axis): 16,
wanted position 1: 45, 45 (theta,phi), Directivity: 1.055623e+01
wanted position 2: 45, 135 (theta,phi), Directivity: 1.053976e+01
wanted position 3: 45, −45 (theta,phi), Directivity: 1.054874e+01
wanted position 4: 45, −135 (theta,phi), Directivity: 1.052895e+01
wanted position 5: 30, 0 (theta,phi), Directivity: 1.056273e+01
wanted position 6: 30, 90 (theta,phi), Directivity: 1.053184e+01
wanted position 7: 30, 180 (theta,phi), Directivity: 1.054106e+01
wanted position 8: 30, −90 (theta,phi), Directivity: 1.053794e+01
wanted position 9: 0, 0 (theta,phi), Directivity: 1.027093e+01
best_cost: 9.454727e+01

TABLE 3

Optimized Phase of Multi Beam Radiation Pattern

| 340.9 | 33.9 | 18.5 | 195.2 | 249.3 | 35.7 | 23.4 | 250.6 | 182.8 | 12.2 | 34.6 | 251.8 | 172.6 | 44.7 | 10.4 | 158.5 |
|---|---|---|---|---|---|---|---|---|---|---|---|---|---|---|---|
| 292.2 | 92.8 | 305.3 | 270.7 | 100.8 | 59.3 | 266.7 | 261.1 | 39.1 | 87.9 | 276.9 | 264.6 | 339.9 | 71.0 | 291.6 | 298.0 |
| 30.0 | 84.8 | 116.8 | 335.4 | 349.5 | 115.8 | 89.0 | 322.9 | 4.4 | 104.4 | 96.3 | 320.2 | 44.4 | 90.2 | 99.4 | 351.0 |
| 338.7 | 90.2 | 50.2 | 39.0 | 18.5 | 71.0 | 50.4 | 87.3 | 844.3 | 97.1 | 78.4 | 16.4 | 357.7 | 102.3 | 53.7 | 28.6 |
| 165.8 | 356.4 | 0.4 | 209.7 | 196.0 | 219.9 | 8.5 | 230.2 | 203.7 | 349.3 | 342.6 | 204.5 | 205.0 | 0.9 | 7.0 | 201.4 |
| 290.0 | 79.0 | 249.1 | 260.4 | 326.9 | 44.8 | 240.5 | 260.9 | 53.9 | 81.5 | 232.8 | 262.9 | 29.4 | 138.9 | 278.0 | 287.9 |
| 24.9 | 107.9 | 85.4 | 310.7 | 39.8 | 124.4 | 96.7 | 313.1 | 356.8 | 129.2 | 84.5 | 308.6 | 5.6 | 88.9 | 107.6 | 344.6 |
| 351.0 | 74.8 | 87.7 | 26.6 | 340.2 | 90.3 | 76.7 | 1.6 | 138.1 | 43.8 | 101.0 | 359.3 | 45.8 | 84.2 | 68.6 | 23.0 |
| 191.6 | 0.8 | 357.2 | 224.9 | 191.5 | 25.3 | 311.5 | 197.4 | 212.2 | 17.0 | 329.1 | 199.1 | 203.0 | 10.0 | 350.7 | 192.7 |
| 325.2 | 112.7 | 284.3 | 225.3 | 295.0 | 118.2 | 311.2 | 241.3 | 297.7 | 125.6 | 302.6 | 241.3 | 301.9 | 115.7 | 285.4 | 280.2 |
| 6.8 | 92.9 | 106.6 | 316.7 | 29.6 | 103.8 | 137.6 | 322.8 | 27.0 | 87.3 | 137.0 | 325.0 | 41.5 | 92.5 | 109.3 | 351.9 |
| 9.5 | 92.5 | 23.7 | 56.0 | 305.0 | 85.3 | 56.1 | 65.6 | 348.4 | 119.3 | 50.1 | 63.4 | 294.3 | 86.2 | 53.2 | 28.8 |
| 218.7 | 349.4 | 129.5 | 253.5 | 197.7 | 2.5 | 327.6 | 220.3 | 198.4 | 43.9 | 315.1 | 222.3 | 138.5 | 332.8 | 17.8 | 208.2 |
| 81.3 | 50.3 | 296.2 | 269.3 | 162.2 | 82.6 | 295.4 | 256.6 | 241.6 | 43.0 | 341.1 | 263.0 | 241.8 | 81.4 | 284.2 | 283.9 |
| 349.2 | 99.6 | 115.9 | 339.6 | 352.4 | 102.3 | 131.6 | 324.4 | 28.2 | 100.8 | 152.3 | 331.1 | 33.5 | 93.0 | 99.1 | 352.6 |
| 37.9 | 40.3 | 50.8 | 334.5 | 41.9 | 59.7 | 42.5 | 39.7 | 339.3 | 82.2 | 39.4 | 51.6 | 313.1 | 66.6 | 44.3 | 27.1 |

Figure 9A:
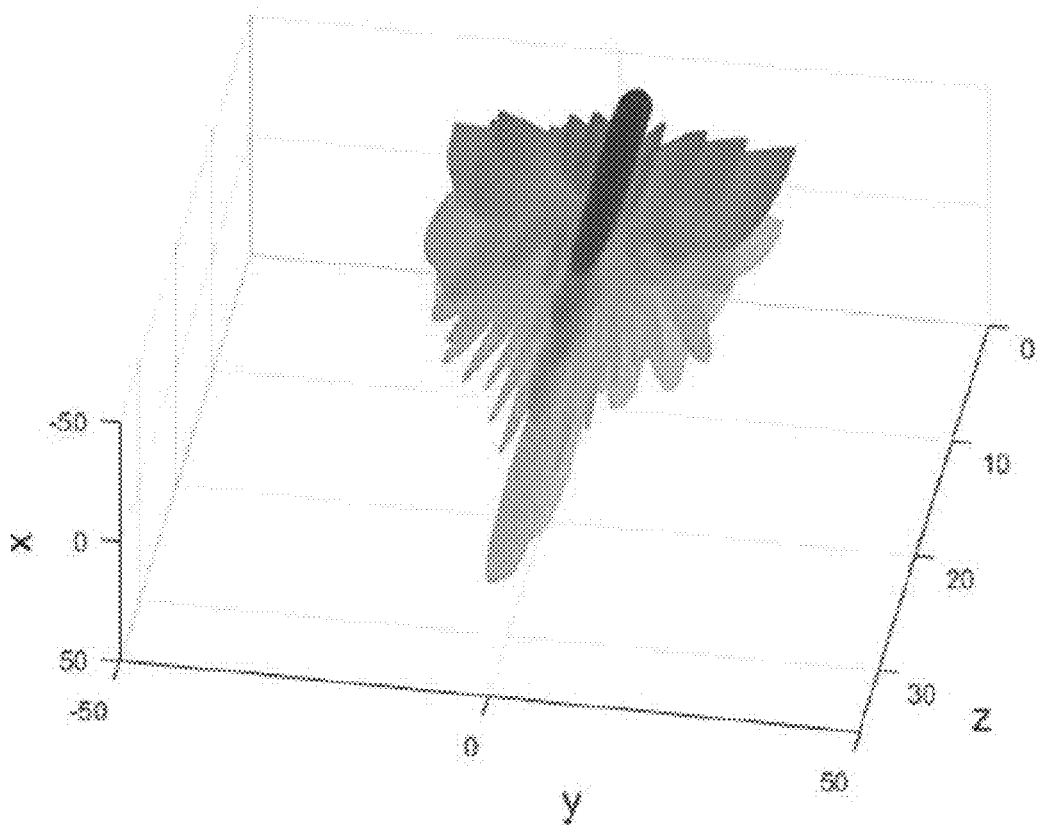
FIG. 9A is a diagram illustrating a straight beam 3D radiation pattern of the beam forming method according to an embodiment of the disclosure.
Figure 9B:
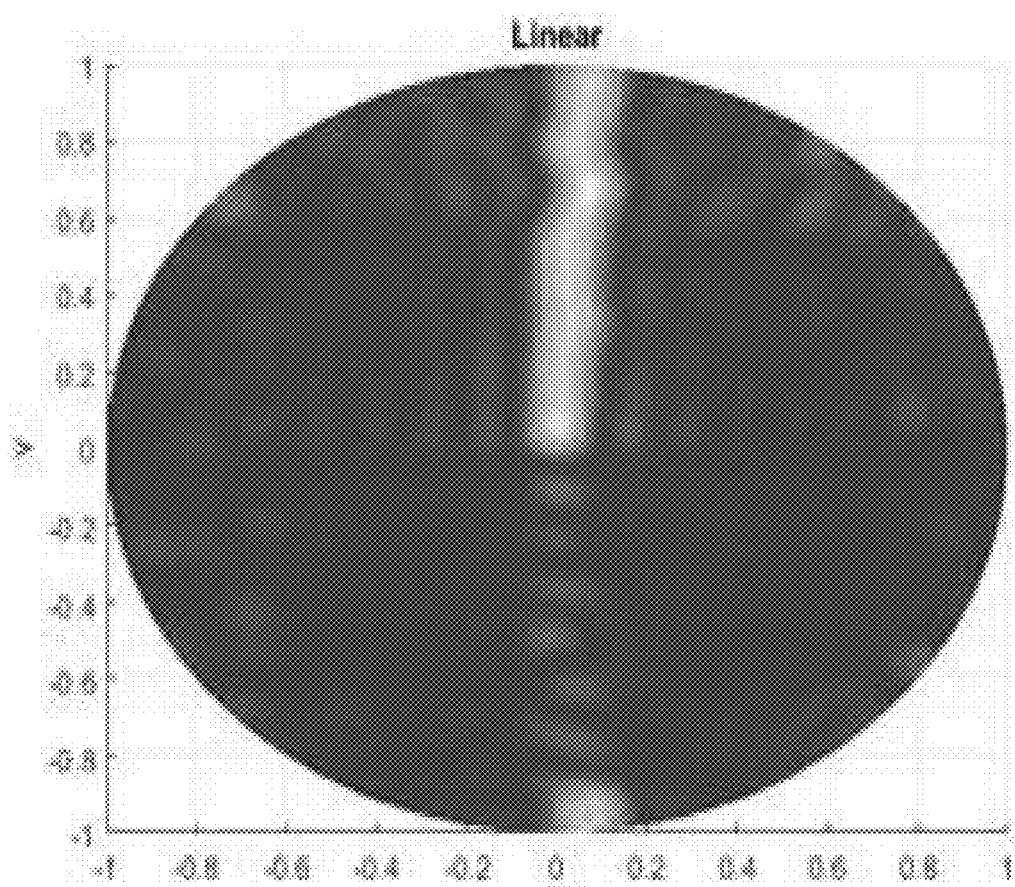
FIG. 9B is a diagram illustrating a straight beam UV radiation pattern of the beam forming method according to an embodiment of the disclosure.

FIG. 9A is a diagram illustrating a straight beam 3D radiation pattern of the beam forming method according to an embodiment of the disclosure, and FIG. 9B is a diagram illustrating a straight beam UV radiation pattern of the beam forming method according to an embodiment of the disclosure.

According to the above-described embodiment, a straight beam on the UV spatial coordinates is configured to be formed in a direction of (θ=0~75°, φ=3°) in a 16×16 planar antenna array, and a completed result of optimization is as follows.

M(x-axis): 16, N(y-axis): 16,
wanted position 1: 2, 3 (theta,phi), Directivity: 1.029300e+01
wanted position 2: 5, 3 (theta,phi), Directivity: 1.127392e+01
wanted position 3: 8, 3 (theta,phi), Directivity: 1.032720e+01
wanted position 4: 11, 3 (theta,phi), Directivity: 1.080357e+01
wanted position 5: 14, 3 (theta,phi), Directivity: 1.041695e+01
wanted position 6: 17, 3 (theta,phi), Directivity: 1.053923e+01
wanted position 7: 20, 3 (theta,phi), Directivity: 1.015698e+01
wanted position 8: 23, 3 (theta,phi), Directivity: 1.047758e+01
wanted position 9: 26, 3 (theta,phi), Directivity: 1.063719e+01 wanted position 10: 29, 3 (theta,phi), Directivity: 1.054389e+01
wanted position 11: 32, 3 (theta,phi), Directivity: 1.075386e+01
wanted position 12: 35, 3 (theta,phi), Directivity: 1.035540e+01
wanted position 13: 38, 3 (theta,phi), Directivity: 9.796542e+00
wanted position 14: 41, 3 (theta,phi), Directivity: 9.175235e+00
wanted position 15: 44, 3 (theta,phi), Directivity: 8.750438e+00
wanted position 16: 47, 3 (theta,phi), Directivity: 9.476163e+00
wanted position 17: 50, 3 (theta,phi), Directivity: 1.065814e+01
wanted position 18: 53, 3 (theta,phi), Directivity: 1.099094e+01
wanted position 19: 56, 3 (theta,phi), Directivity: 1.060725e+01
wanted position 20: 59, 3 (theta,phi), Directivity: 1.023420e+01
wanted position 21: 62, 3 (theta,phi), Directivity: 1.003993e+01
wanted position 22: 65, 3 (theta,phi), Directivity: 9.880709e+00
wanted position 23: 68, 3 (theta,phi), Directivity: 9.722886e+00
wanted position 24: 71, 3 (theta,phi), Directivity: 9.590399e+00
wanted position 25: 74, 3 (theta,phi), Directivity: 9.443948e+00
best_cost: 9.855314e+00
max_Power: 3.558066e+01

Figure 10A:
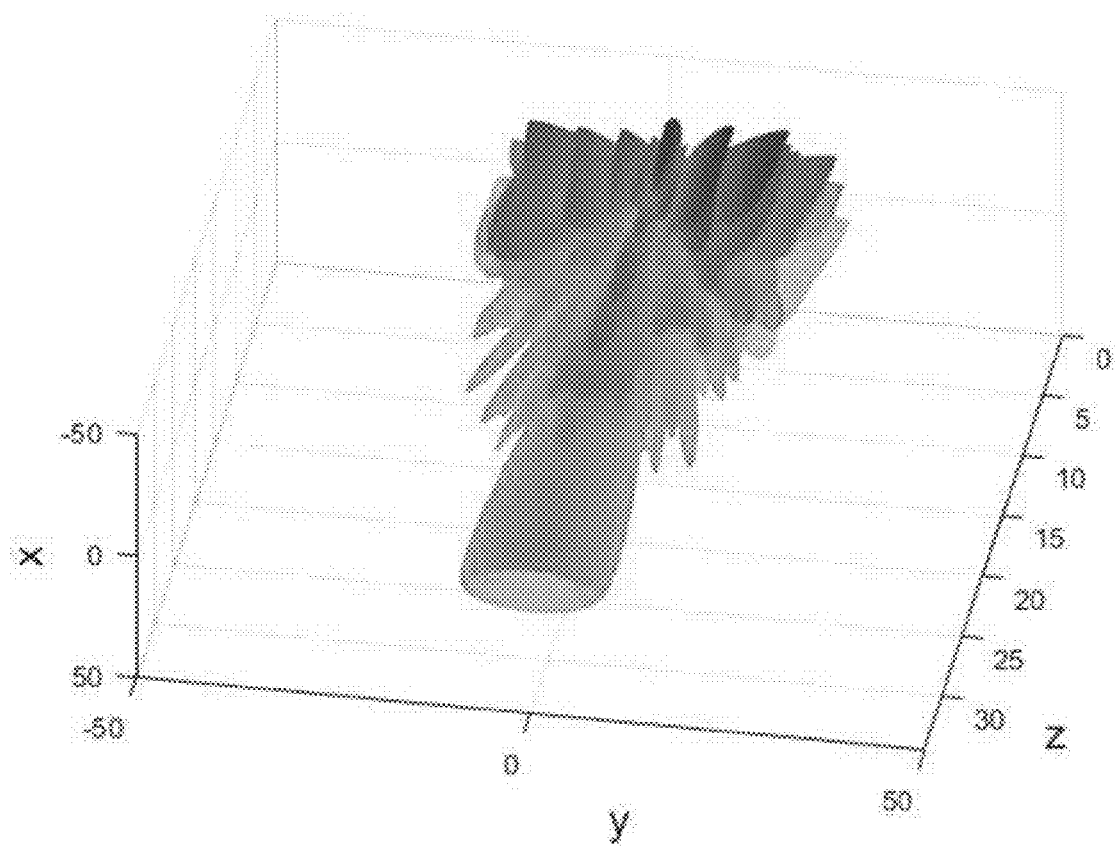
FIG. 10A is a diagram illustrating a circular beam 3D radiation pattern of the beam forming method according to an embodiment of the disclosure.
Figure 10B:
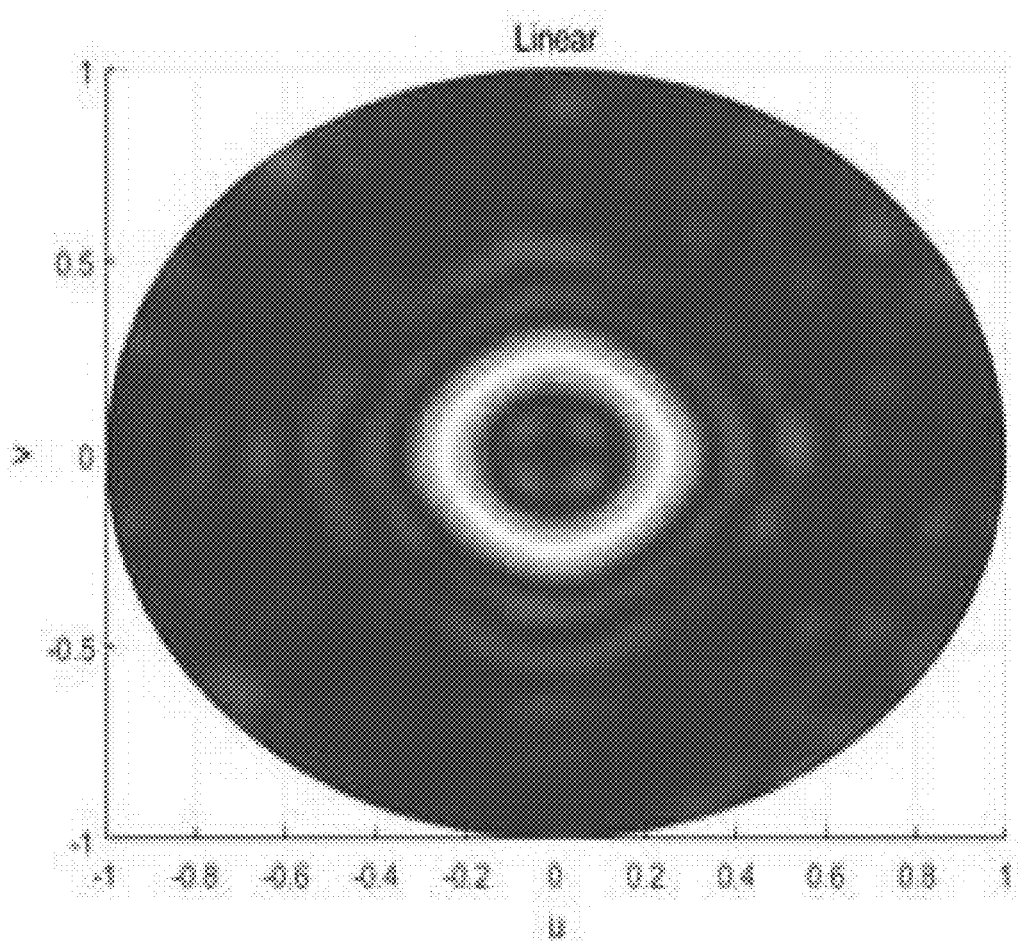
FIG. 10B is a diagram illustrating a circular beam UV radiation pattern of the beam forming method according to an embodiment of the disclosure.

FIG. 10A is a diagram illustrating a circular beam 3D radiation pattern of the beam forming method according to an embodiment of the disclosure, and FIG. 10B is a diagram illustrating a circular beam UV radiation pattern of the beam forming method according to an embodiment of the disclosure.

According to the above-described embodiment, a circular beam on the UV spatial coordinates is configured to be formed in a direction of ($\theta$=13°, ($\varphi$=−180°-180°) in a 16×16 planar antenna array, and a completed result of optimization is as follows.

wanted position 1: 13, −180 (theta,phi), Directivity: 7.589991e+00
wanted position 2: 13, −172 (theta,phi), Directivity: 7.710929e+00
wanted position 3: 13, −164 (theta,phi), Directivity: 7.966688e+00
wanted position 4: 13, −156 (theta,phi), Directivity: 8.263815e+00
wanted position 5: 13, −148 (theta,phi), Directivity: 8.501645e+00
wanted position 6: 13, −140 (theta,phi), Directivity: 8.621520e+00
wanted position 7: 13, −132 (theta,phi), Directivity: 8.700164e+00
wanted position 8: 13, −124 (theta,phi), Directivity: 8.704343e+00
wanted position 9: 13, −116 (theta,phi), Directivity: 8.517528e+00
wanted position 10: 13, −108 (theta,phi), Directivity: 8.242301e+00

TABLE 4

Optimized Phase of Straight Beam Radiation Pattern

| | | | | | | | |
|---|---|---|---|---|---|---|---|
| 1.80 | 30.63 | 336.36 | 31.71 | 12.50 | 315.19 | 40.08 | 306.89 |
| 27.10 | 271.80 | 86.53 | 306.13 | 168.75 | 21.61 | 223.04 | 48.98 |
| 286.88 | 58.41 | 276.69 | 103.02 | 316.17 | 204.27 | 0.55 | 230.63 |
| 86.03 | 227.39 | 91.87 | 230.62 | 123.57 | 61.16 | 146.40 | 77.63 |
| 17.83 | 36.19 | 19.78 | 31.83 | 23.53 | 351.33 | 15.51 | 8.38 |
| 331.08 | 335.41 | 330.53 | 339.92 | 316.61 | 342.65 | 314.18 | 319.12 |
| 297.99 | 287.99 | 283.91 | 277.20 | 271.69 | 268.50 | 260.70 | 254.66 |
| 219.62 | 212.79 | 184.44 | 201.30 | 152.36 | 191.01 | 120.92 | 184.70 |
| 278.55 | 18.83 | 278.78 | 9.40 | 271.44 | 335.88 | 265.62 | 297.85 |
| 219.92 | 219.63 | 190.91 | 209.36 | 172.84 | 168.64 | 172.77 | 142.37 |
| 74.90 | 136.54 | 32.49 | 135.66 | 42.53 | 291.32 | 66.10 | 297.69 |
| 210.31 | 322.18 | 202.61 | 345.37 | 225.06 | 101.95 | 255.39 | 124.78 |
| 349.54 | 166.11 | 31.75 | 213.19 | 73.63 | 282.74 | 103.29 | 324.10 |
| 186.48 | 354.48 | 248.20 | 95.09 | 293.30 | 113.00 | 298.63 | 151.08 |
| 320.11 | 218.52 | 76.11 | 283.49 | 151.58 | 273.98 | 121.73 | 259.11 |
| 194.23 | 349.97 | 244.88 | 150.35 | 303.47 | 58.40 | 243.63 | 321.97 |
| 63.11 | 319.72 | 59.14 | 297.89 | 49.40 | 297.80 | 8.15 | 28.63 |
| 301.92 | 186.63 | 297.95 | 73.11 | 277.40 | 66.74 | 293.33 | 312.04 |
| 169.28 | 305.44 | 147.23 | 260.34 | 116.91 | 248.18 | 144.89 | 86.73 |
| 52.38 | 119.13 | 34.60 | 84.24 | 24.26 | 62.98 | 23.14 | 3.09 |
| 346.73 | 2.67 | 346.21 | 349.32 | 349.02 | 331.21 | 331.08 | 334.48 |
| 317.43 | 311.54 | 307.03 | 304.15 | 296.72 | 300.36 | 291.44 | 289.83 |
| 252.01 | 244.69 | 226.94 | 237.65 | 210.26 | 229.81 | 205.65 | 210.18 |
| 112.49 | 143.17 | 13.83 | 151.69 | 345.60 | 106.21 | 318.46 | 299.92 |
| 263.74 | 272.60 | 228.52 | 270.20 | 218.17 | 238.30 | 210.78 | 209.09 |
| 165.79 | 138.34 | 105.07 | 161.68 | 106.57 | 78.33 | 141.20 | 63.60 |
| 69.93 | 327.07 | 257.75 | 36.93 | 290.02 | 226.96 | 334.66 | 239.07 |
| 281.87 | 172.20 | 75.38 | 236.89 | 130.98 | 39.22 | 196.29 | 130.39 |
| 168.99 | 26.05 | 247.13 | 80.37 | 314.04 | 190.44 | 334.38 | 51.13 |
| 3.97 | 241.80 | 69.21 | 282.91 | 174.25 | 353.00 | 199.57 | 279.55 |
| 233.09 | 112.44 | 253.76 | 150.32 | 0.20 | 189.65 | 25.78 | 176.34 |
| 79.18 | 274.78 | 45.74 | 294.60 | 226.80 | 342.24 | 241.03 | 288.70 | wanted position 11: 13, −100 (theta,phi), Directivity: 8.012788e+00
wanted position 12: 13, −92 (theta,phi), Directivity: 7.867926e+00
wanted position 13: 13, −84 (theta,phi), Directivity: 7.852559e+00
wanted position 14: 13, −76 (theta,phi), Directivity: 7.953752e+00
wanted position 15: 13, −68 (theta,phi), Directivity: 8.175032e+00
wanted position 16: 13, −60 (theta,phi), Directivity: 8.488901e+00
wanted position 17: 13, −52 (theta,phi), Directivity: 8.678477e+00
wanted position 18: 13, −44 (theta,phi), Directivity: 8.695002e+00
wanted position 19: 13, −36 (theta,phi), Directivity: 8.654160e+00
wanted position 20: 13, −28 (theta,phi), Directivity: 8.450806e+00
wanted position 21: 13, −20 (theta,phi), Directivity: 8.094033e+00
wanted position 22: 13, −12 (theta,phi), Directivity: 7.817851e+00
wanted position 23: 13, −4 (theta,phi), Directivity: 7.724344e+00
wanted position 24: 13, 4 (theta,phi), Directivity: 7.811213e+00
wanted position 25: 13, 12 (theta,phi), Directivity: 8.011088e+00
wanted position 26: 13, 20 (theta,phi), Directivity: 8.223629e+00
wanted position 27: 13, 28 (theta,phi), Directivity: 8.442969e+00
wanted position 28: 13, 36 (theta,phi), Directivity: 8.609842e+00
wanted position 29: 13, 44 (theta,phi), Directivity: 8.653634e+00
wanted position 30: 13, 52 (theta,phi), Directivity: 8.615123e+00
wanted position 31: 13, 60 (theta,phi), Directivity: 8.450025e+00
wanted position 32: 13, 68 (theta,phi), Directivity: 8.156109e+00
wanted position 33: 13, 76 (theta,phi), Directivity: 7.872889e+00
wanted position 34: 13, 84 (theta,phi), Directivity: 7.695874e+00
wanted position 35: 13, 92 (theta,phi), Directivity: 7.701972e+00
wanted position 36: 13, 100 (theta,phi), Directivity: 7.897881e+00
wanted position 37: 13, 108 (theta,phi), Directivity: 8.181289e+00
wanted position 38: 13, 116 (theta,phi), Directivity: 8.477376e+00
wanted position 39: 13, 124 (theta,phi), Directivity: 8.685414e+00
wanted position 40: 13, 132 (theta,phi), Directivity: 8.729433e+00
wanted position 41: 13, 140 (theta,phi), Directivity: 8.681654e+00
wanted position 42: 13, 148 (theta,phi), Directivity: 8.562435e+00
wanted position 43: 13, 156 (theta,phi), Directivity: 8.311124e+00
wanted position 448: 13, 164 (theta,phi), Directivity: 7.974426e+
wanted position 45: 13, 172 (theta,phi), Directivity: 7.689530e+
best_cost: 8.108097e+00
max_Power: 3.550702e+1

TABLE 5

| Optimized Phase of Circular Beam Radiation Pattern | | | | | | | |
|---|---|---|---|---|---|---|---|
| 237.99 | 75.15 | 72.44 | 90.19 | 92.64 | 78.23 | 158.39 | 71.96 |
| 57.70 | 1.74 | 86.11 | 47.13 | 100.94 | 205.67 | 40.57 | 235.61 |
| 344.90 | 67.88 | 7.81 | 141.85 | 357.08 | 210.16 | 273.47 | 324.66 |
| 20.46 | 345.66 | 120.52 | 318.40 | 202.02 | 259.04 | 270.60 | 301.98 |
| 342.58 | 47.04 | 296.29 | 132.80 | 235.04 | 240.00 | 256.03 | 296.31 |
| 347.19 | 343.15 | 172.36 | 223.55 | 201.33 | 225.01 | 247.23 | 310.08 |
| 3.81 | 259.24 | 151.20 | 178.36 | 197.06 | 193.90 | 247.62 | 209.62 |
| 311.25 | 105.52 | 180.65 | 142.93 | 147.40 | 163.77 | 174.19 | 26.90 |
| 228.55 | 328.35 | 128.00 | 96.86 | 113.94 | 83.93 | 87.15 | 248.45 |
| 316.86 | 150.22 | 20.17 | 99.60 | 68.42 | 63.34 | 15.08 | 48.38 |
| 254.57 | 312.23 | 113.26 | 49.99 | 48.79 | 40.36 | 22.28 | 312.13 |
| 286.92 | 188.77 | 324.42 | 77.49 | 41.68 | 20.71 | 357.78 | 331.97 |
| 252.28 | 283.59 | 182.87 | 21.78 | 8.14 | 16.96 | 2.03 | 313.75 |
| 245.72 | 229.02 | 214.63 | 223.24 | 107.45 | 2.40 | 302.17 | 0.12 |
| 297.99 | 176.96 | 213.99 | 163.88 | 224.12 | 182.99 | 43.29 | 229.83 |
| 86.71 | 273.44 | 166.15 | 192.95 | 165.18 | 143.96 | 189.72 | 86.15 |
| 192.22 | 117.77 | 176.42 | 164.10 | 169.98 | 233.61 | 163.65 | 34.79 |
| 38.00 | 233.67 | 147.40 | 203.95 | 186.95 | 181.95 | 244.71 | 291.20 |
| 302.14 | 19.00 | 352.87 | 106.20 | 233.81 | 237.10 | 240.49 | 195.57 |
| 332.50 | 1.71 | 14.98 | 45.14 | 288.73 | 126.12 | 266.96 | 267.47 |
| 344.70 | 8.97 | 36.31 | 32.72 | 81.14 | 299.92 | 201.93 | 284.52 |
| 353.66 | 22.34 | 45.47 | 60.27 | 52.67 | 80.49 | 275.34 | 270.91 |
| 7.41 | 71.97 | 53.66 | 85.77 | 69.46 | 187.07 | 40.70 | 261.63 |
| 191.83 | 64.02 | 126.09 | 102.47 | 139.01 | 68.71 | 228.18 | 339.58 |
| 93.84 | 220.64 | 148.62 | 168.64 | 131.89 | 208.36 | 58.09 | 289.53 |
| 260.11 | 193.28 | 214.56 | 187.24 | 189.16 | 82.44 | 254.25 | 12.19 |
| 270.41 | 243.98 | 220.83 | 198.19 | 230.72 | 195.31 | 26.24 | 328.26 |
| 284.73 | 253.98 | 225.05 | 244.72 | 144.93 | 315.49 | 348.87 | 5.04 |
| 300.29 | 249.63 | 265.81 | 173.87 | 271.74 | 44.72 | 46.18 | 342.04 |

TABLE 5-continued

Optimized Phase of Circular Beam Radiation Pattern

| 252.81 | 328.68 | 196.19 | 355.07 | 86.72 | 60.36 | 354.80 | 67.04 |
| 23.99 | 191.42 | 40.98 | 128.33 | 63.05 | 35.11 | 91.20 | 292.29 |
| 162.71 | 78.13 | 130.61 | 79.39 | 72.59 | 107.54 | 354.26 | 192.33 |

Figure 11A:
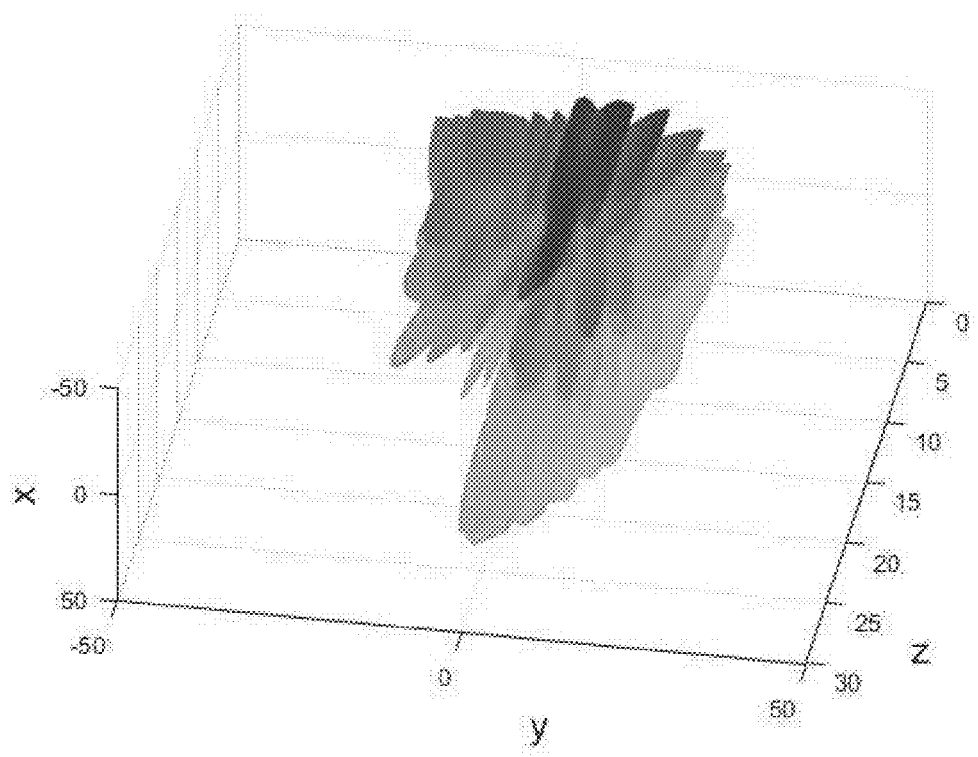
FIG. 11A is a diagram illustrating a spatial beam 3D radiation pattern of the beam forming method according to an embodiment of the disclosure.
Figure 11B:
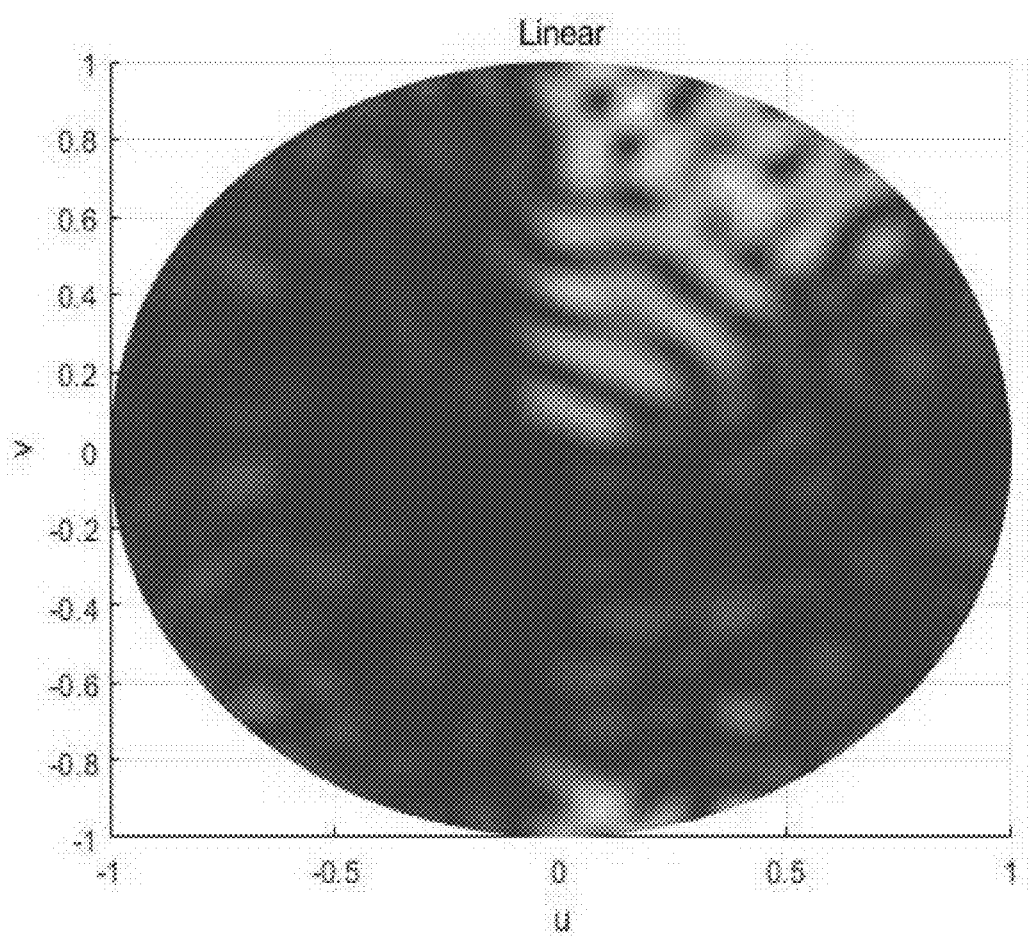
FIG. 11B is a diagram illustrating a spatial beam UV radiation pattern of the beam forming method according to an embodiment of the disclosure.

FIG. 11A is a diagram illustrating a spatial beam 3D radiation pattern of the beam forming method according to an embodiment of the disclosure, and FIG. 11B is a diagram illustrating a spatial beam UV radiation pattern of the beam forming method according to an embodiment of the disclosure.

According to the above-described embodiment, a spatial beam on the UV spatial coordinates is configured to be formed in a direction of ($\theta$=0~90°, ($\varphi$=0~45°) in a 16×16 planar antenna array, and a completed result of optimization is as follows.

wanted position 1: 5, 2 (theta,phi), Directivity: 4.856779e+00
wanted position 2: 5, 8 (theta,phi), Directivity: 5.097531e+00
wanted position 3: 5, 14 (theta,phi), Directivity: 5.255056e+00
wanted position 4: 5, 20 (theta,phi), Directivity: 5.354839e+00
wanted position 5: 5, 26 (theta,phi), Directivity: 5.412483e+00
wanted position 6: 5, 32 (theta,phi), Directivity: 5.424856e+00
wanted position 7: 5, 38 (theta,phi), Directivity: 5.368116e+00
wanted position 8: 5, 44 (theta,phi), Directivity: 5.204053e+00
wanted position 9: 15, 2 (theta,phi), Directivity: 6.336837e+00
wanted position 10: 15, 8 (theta,phi), Directivity: 7.045180e+00
wanted position 11: 15, 14 (theta,phi), Directivity: 7.192641e+00
wanted position 12: 15, 20 (theta,phi), Directivity: 7.095471e+00
wanted position 13: 15, 26 (theta,phi), Directivity: 6.856580e+00
wanted position 14: 15, 32 (theta,phi), Directivity: 6.544648e+00
wanted position 15: 15, 38 (theta,phi), Directivity: 6.281906e+00
wanted position 16: 15, 44 (theta,phi), Directivity: 5.922037e+00
wanted position 17: 25, 2 (theta,phi), Directivity: 7.926059e+00
wanted position 18: 25, 8 (theta,phi), Directivity: 8.036762e+00
wanted position 19: 25, 14 (theta,phi), Directivity: 6.544102e+00
wanted position 20: 25, 20 (theta,phi), Directivity: 5.733035e+00
wanted position 21: 25, 26 (theta,phi), Directivity: 5.863583e+00
wanted position 22: 25, 32 (theta,phi), Directivity: 6.279916e+00
wanted position 23: 25, 38 (theta,phi), Directivity: 6.486085e+00
wanted position 24: 25, 44 (theta,phi), Directivity: 6.017693e+00
wanted position 25: 35, 2 (theta,phi), Directivity: 7.213663e+00
wanted position 26: 35, 8 (theta,phi), Directivity: 6.609847e+00
wanted position 27: 35, 14 (theta,phi), Directivity: 5.508557e+00
wanted position 28: 35, 20 (theta,phi), Directivity: 4.915119e+00
wanted position 29: 35, 26 (theta,phi), Directivity: 4.829317e+00
wanted position 30: 35, 32 (theta,phi), Directivity: 5.697831e+00
wanted position 31: 35, 38 (theta,phi), Directivity: 6.433405e+00
wanted position 32: 35, 44 (theta,phi), Directivity: 6.568159e+00
wanted position 33: 45, 2 (theta,phi), Directivity: 5.553872e+00
wanted position 34: 45, 8 (theta,phi), Directivity: 5.642836e+00
wanted position 35: 45, 14 (theta,phi), Directivity: 4.194839e+00
wanted position 36: 45, 20 (theta,phi), Directivity: 5.469159e+00
wanted position 37: 45, 26 (theta,phi), Directivity: 5.944088e+00
wanted position 38: 45, 32 (theta,phi), Directivity: 4.803647e+00
wanted position 39: 45, 38 (theta,phi), Directivity: 5.515942e+00
wanted position 40: 45, 44 (theta,phi), Directivity: 5.277376e+00
wanted position 41: 55, 2 (theta,phi), Directivity: 6.274820e+00
wanted position 42: 55, 8 (theta,phi), Directivity: 5.616091e+00
wanted position 43: 55, 14 (theta,phi), Directivity: 6.065161e+00
wanted position 44: 55, 20 (theta,phi), Directivity: 6.431968e+00
wanted position 45: 55, 26 (theta,phi), Directivity: 7.427961e+00
wanted position 46: 55, 32 (theta,phi), Directivity: 8.075464e+00
wanted position 47: 55, 38 (theta,phi), Directivity: 6.438115e+00
wanted position 48: 55, 44 (theta,phi), Directivity: 6.244284e+00
wanted position 49: 65, 2 (theta,phi), Directivity: 6.093542e+00
wanted position 50: 65, 8 (theta,phi), Directivity: 6.475673e+00
wanted position 51: 65, 14 (theta,phi), Directivity: 6.503643e+00
wanted position 52: 65, 20 (theta,phi), Directivity: 5.955536e+00 wanted position 53: 65, 26 (theta,phi), Directivity: 5.720184e+00 wanted position 54: 65, 32 (theta,phi), Directivity: 5.527754e+00 wanted position 55: 65, 38 (theta,phi), Directivity: 6.206027e+00 wanted position 56: 65, 44 (theta,phi), Directivity: 6.246915e+00 wanted position 57: 75, 2 (theta,phi), Directivity: 6.199149e+00 wanted position 58: 75, 8 (theta,phi), Directivity: 6.096425e+00 wanted position 59: 75, 14 (theta,phi), Directivity: 6.063189e+00 wanted position 60: 75, 20 (theta,phi), Directivity: 6.258582e+00 wanted position 61: 75, 26 (theta,phi), Directivity: 6.307800e+00 wanted position 62: 75, 32 (theta,phi), Directivity: 6.398578e+00 wanted position 63: 75, 38 (theta,phi), Directivity: 6.198367e+00 wanted position 64: 75, 44 (theta,phi), Directivity: 6.181110e+00 wanted position 65: 85, 2 (theta,phi), Directivity: 6.162178e+00 wanted position 66: 85, 8 (theta,phi), Directivity: 6.204556e+00 wanted position 67: 85, 14 (theta,phi), Directivity: 6.242654e+00 wanted position 68: 85, 20 (theta,phi), Directivity: 6.164102e+00 wanted position 69: 85, 26 (theta,phi), Directivity: 6.185315e+00 wanted position 70: 85, 32 (theta,phi), Directivity: 6.131728e+00 wanted position 71: 85, 38 (theta,phi), Directivity: 6.205832e+00 wanted position 72: 85, 44 (theta,phi), Directivity: 6.202067e+00 best_cost: 5.572561e+00 max_Power: 3.448338e+01

TABLE 6

Optimized Phase of Spatial Beam Radiation Pattern

| | | | | | | | |
|---|---|---|---|---|---|---|---|
| 354.04 | 324.51 | 290.09 | 241.23 | 190.31 | 86.49 | 52.55 | 260.57 |
| 310.46 | 263.50 | 163.28 | 223.46 | 52.86 | 252.38 | 294.93 | 41.43 |
| 264.16 | 224.69 | 248.55 | 68.36 | 237.16 | 299.04 | 200.27 | 238.35 |
| 150.53 | 196.27 | 108.90 | 217.34 | 75.30 | 174.60 | 60.88 | 159.40 |
| 268.67 | 98.76 | 290.26 | 75.72 | 215.35 | 12.38 | 184.35 | 75.39 |
| 173.39 | 160.27 | 127.97 | 250.50 | 113.46 | 107.81 | 32.60 | 303.78 |
| 88.55 | 33.97 | 310.82 | 105.22 | 4.31 | 304.70 | 250.57 | 132.14 |
| 317.25 | 185.43 | 88.49 | 314.77 | 233.04 | 145.82 | 101.71 | 319.66 |
| 146.12 | 50.70 | 275.02 | 118.91 | 101.74 | 332.14 | 319.86 | 214.19 |
| 8.29 | 246.77 | 355.01 | 252.99 | 277.79 | 158.15 | 202.37 | 72.49 |
| 195.75 | 40.89 | 193.03 | 128.30 | 102.63 | 147.04 | 51.06 | 155.46 |
| 22.20 | 188.94 | 59.29 | 13.77 | 271.48 | 35.61 | 179.67 | 28.83 |
| 240.36 | 182.75 | 59.02 | 207.35 | 125.20 | 30.51 | 77.44 | 301.95 |
| 124.29 | 46.70 | 230.91 | 48.63 | 317.01 | 59.45 | 289.96 | 78.06 |
| 4.36 | 238.38 | 5.78 | 214.40 | 77.14 | 89.36 | 20.89 | 307.49 |
| 157.44 | 14.19 | 72.49 | 342.51 | 318.56 | 305.31 | 286.45 | 276.76 |
| 20.66 | 130.26 | 24.24 | 338.57 | 238.54 | 102.23 | 22.84 | 330.28 |
| 202.23 | 348.08 | 273.33 | 228.04 | 121.23 | 324.36 | 231.46 | 133.66 |
| 254.12 | 207.02 | 162.67 | 310.13 | 7.75 | 189.45 | 71.02 | 344.18 |
| 117.72 | 95.66 | 30.64 | 324.61 | 258.35 | 210.19 | 9.62 | 221.30 |
| 286.06 | 52.49 | 261.68 | 184.65 | 127.65 | 80.50 | 348.40 | 24.04 |
| 88.48 | 284.67 | 135.08 | 50.98 | 341.33 | 286.16 | 227.31 | 201.54 |
| 270.35 | 128.87 | 345.85 | 259.38 | 201.12 | 149.94 | 91.57 | 334.97 |
| 67.25 | 269.62 | 214.01 | 151.38 | 95.49 | 35.59 | 287.84 | 175.13 |
| 156.41 | 145.31 | 112.90 | 65.51 | 23.01 | 287.72 | 112.56 | 351.85 |
| 208.99 | 71.08 | 34.73 | 330.48 | 239.08 | 273.09 | 212.44 | 149.64 |
| 71.56 | 55.35 | 346.16 | 108.56 | 344.47 | 125.10 | 50.77 | 358.78 |
| 351.37 | 317.06 | 275.83 | 274.02 | 200.91 | 307.09 | 254.97 | 209.94 |
| 168.95 | 242.85 | 153.63 | 147.05 | 117.60 | 123.58 | 112.50 | 63.51 |
| 321.41 | 112.19 | 329.42 | 92.02 | 346.33 | 3.99 | 298.21 | 226.09 |
| 61.19 | 301.07 | 62.77 | 330.45 | 317.35 | 202.29 | 30.14 | 54.86 |
| 240.56 | 271.89 | 257.02 | 229.20 | 177.66 | 350.89 | 185.38 | 243.56 |

On the other hand, when forming a beam, a technique for forming a null for a specific area or suppressing a side lobe is required in order to avoid the human body and obstacles and to reduce interference. Hereinafter, null formation and side lobe suppression of the beam forming method according to an embodiment of the disclosure will be described with reference to FIGS. 12 and 13.

Figure 12:
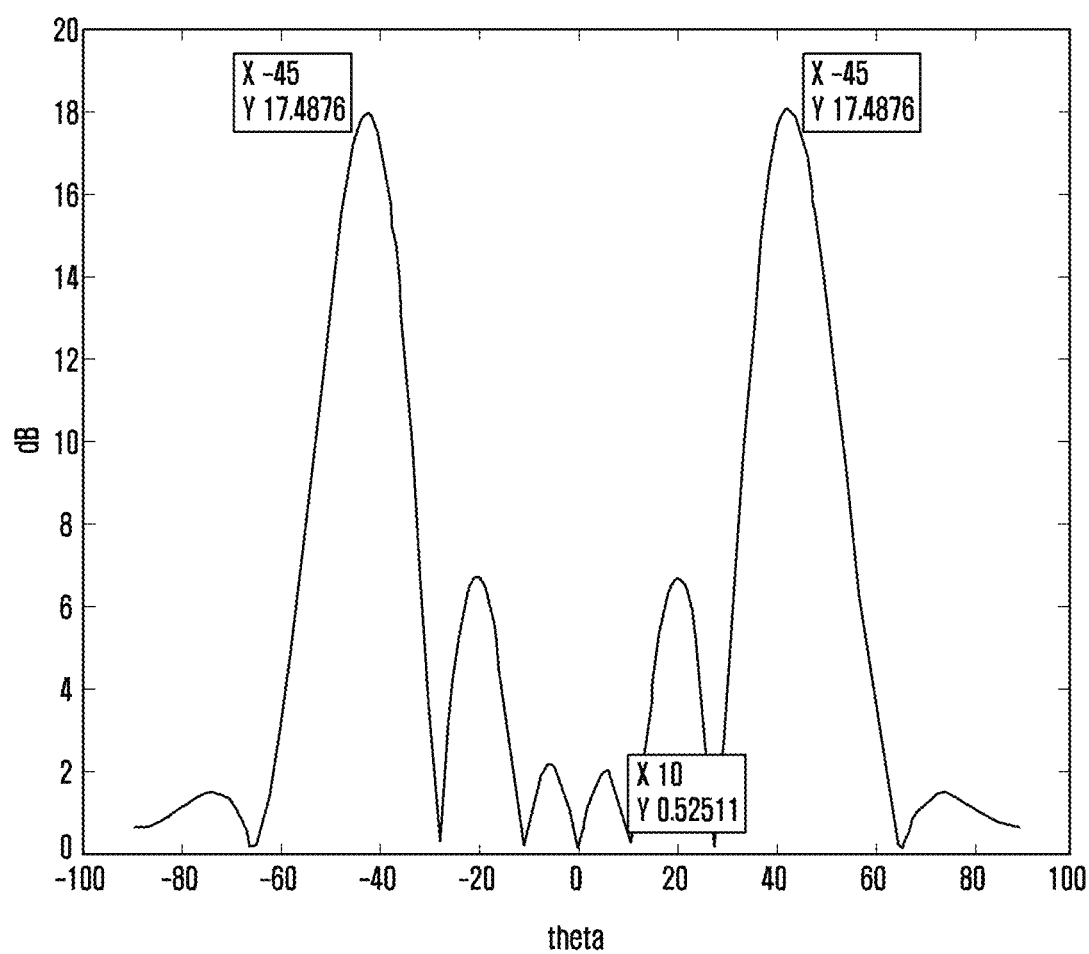
FIG. 12 is a diagram illustrating a radiation pattern having a null in the beam forming method according to an embodiment of the disclosure.

FIG. 12 is a diagram illustrating a radiation pattern having a null in the beam forming method according to an embodiment of the disclosure.

According to an embodiment of the disclosure, by configuring a region for forming a null together with a region for increasing the intensity of a beam and, based thereon, optimizing an objective function, it is possible to form a beam pattern having a null in a specific region as shown in FIG. 12. In this case, in the above-described embodiment, the first region may be configured as a region for increasing the intensity of a beam, and the second region may be configured as a region for forming a null.

With reference to FIG. 12, in a 4×8 planar antenna array, beams are configured to be simultaneously maximized in directions of ($\theta$=−45°, $\varphi$=90°) and ($\theta$=20° ~45°, $\varphi$=90°), and also a beam is configured to be minimized in a direction of ($\theta$=10°, $\varphi$=90°) and thereby form a null, and a completed result of optimization is as follows.

M(x-axis): 4, N(y-axis): 8,
wanted position 1: −45, 90 (theta,phi), Directivity: 1.732833e+01
wanted position 2: 45, 90 (theta,phi), Directivity: 1.756664e+01
nulling position 1: 10, 90 (theta,phi), Directivity: 1.562404e-02
best_cost: 3.492198e+01

TABLE 7

Optimized Phase of Radiation Pattern with Double Beam and Null

| | | | | | | | |
|---|---|---|---|---|---|---|---|
| 160.6 | 317.5 | 46.83 | 193.7 | 12.86 | 228.5 | 137.7 | 341.8 |
| 208.9 | 53.04 | 284.4 | 147.5 | 326.7 | 105.5 | 233.3 | 30.15 |
| 145.9 | 302.8 | 70.52 | 209.3 | 28.54 | 251.6 | 123 | 327.1 |
| 194.2 | 38.31 | 307.5 | 163.2 | 342.3 | 129.2 | 218.5 | 15.5 |

Figure 13:
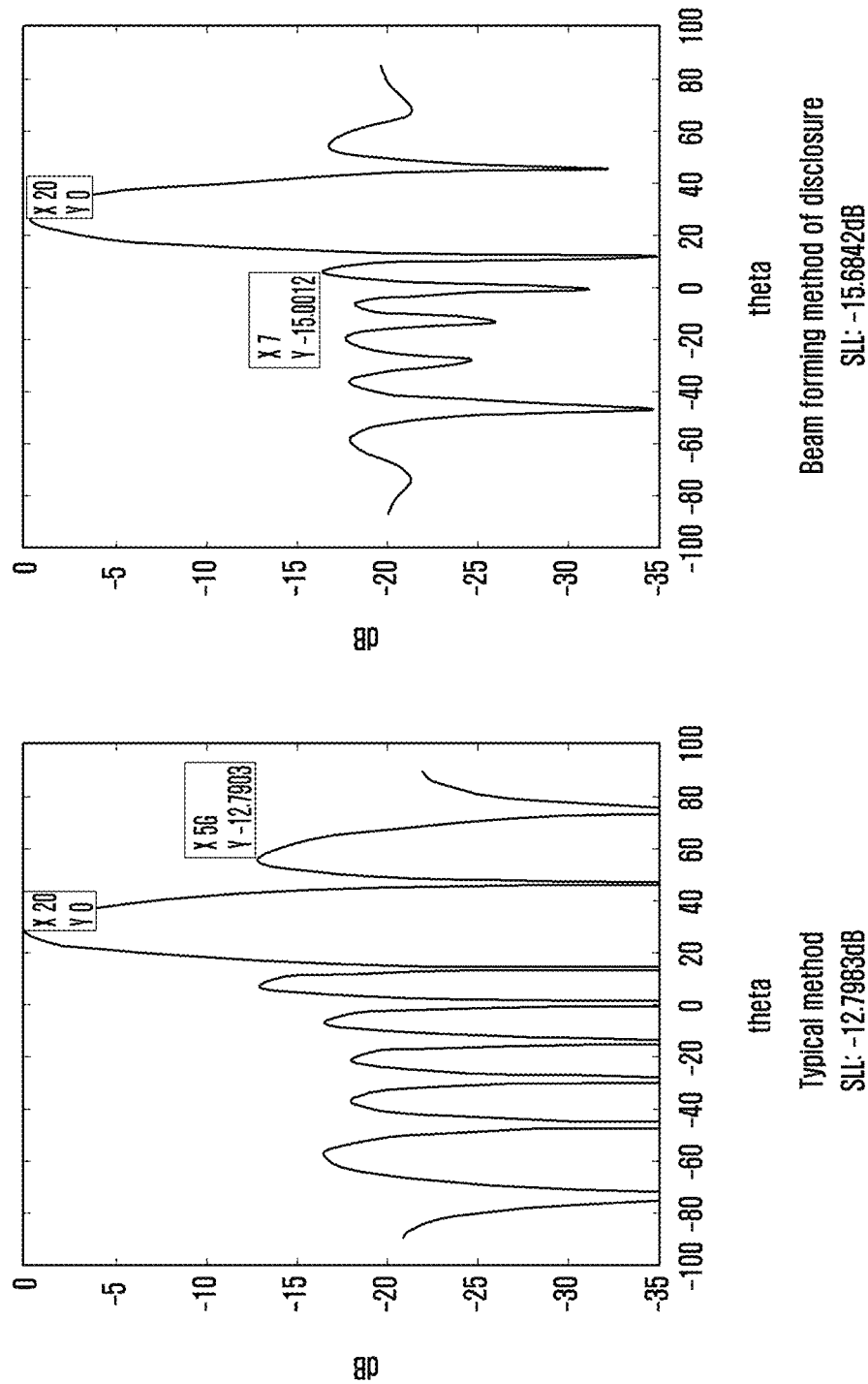
FIG. 13 is a diagram illustrating side lobe suppression in the beam forming method according to an embodiment of the disclosure.

FIG. 13 is a diagram illustrating side lobe suppression in the beam forming method according to an embodiment of the disclosure.

Typically, in case of forming or synthesizing a beam in a direction corresponding to a region where a beam is to be formed using an antenna, a beam pattern having a certain level may be formed in a side lobe other than a main lobe.

According to a beam forming method according to an embodiment of the disclosure, by configuring a region (side lobe) for decreasing the intensity of a beam together with a region (main lobe) for increasing the intensity of a beam and, based thereon, optimizing an objective function, it is possible to effectively suppress the side lobe level. In this case, the first region may be configured as the main lobe, and the second region may be configured as the side lobe.

The methods according to claims or embodiments described in the disclosure may be implemented by hardware, software, or a combination of hardware and software.

In case of implementation using software, a computer-readable storage medium for storing one or more programs (software modules) may be provided as hardware. One or more programs stored in the computer-readable storage medium are configured for execution by one or more processors in an electronic device. The one or more programs include instructions that cause the electronic device to perform the methods according to claims or embodiments described herein.

Such programs (software module, software) may be stored in a random access memory, a non-volatile memory including a flash memory, a read only memory (ROM), an electrically erasable programmable ROM (EEPROM), a magnetic disc storage device, a compact disc ROM (CD-ROM), digital versatile discs (DVDs) or other optical storage devices, and a magnetic cassette. Alternatively, the programs may be stored in a memory combining part or all of the above recording media. A plurality of memories may be equipped.

In addition, the programs may be stored in an attachable storage device accessible via a communication network formed of Internet, Intranet, local area network (LAN), wide area network (WAN), or storage area network (SAN) alone or in combination. This storage device may access an apparatus performing embodiments of the disclosure through an external port. In addition, a separate storage device in the communication network may access an apparatus performing embodiments of the disclosure.

In the above-discussed embodiments of the disclosure, elements included in the disclosure are expressed as a singular or plural form depending on the discussed specific embodiments. However, it is to be understood that such singular or plural representations are selected appropriately according to situations presented for the convenience of description, and the disclosure is not limited to the singular or plural form. Even expressed in a singular form, an element may be construed as a plurality of elements, and vice versa.

Meanwhile, embodiments of the disclosure and the accompanying drawings are only examples presented in order to easily describe the disclosure and facilitate comprehension of the disclosure, but are not intended to limit the scope of the disclosure. That is, it is apparent to a person skilled in the art that other modifications based on technical ideas of the disclosure can be implemented. In addition, the above-described embodiments may be used in combination with each other as needed. For example, it may be possible to apply the first embodiment and the second embodiment in combination, or to apply a part of the first embodiment and a part of the second embodiment in combination. In addition, the above embodiments and their modifications may be implemented in the LTE system, the 5G system, and the like.

The invention claimed is:

1. A method for forming a beam of an antenna array, the method comprising:
configuring a first region and a second region for beam forming;
calculating a first directivity function corresponding to the first region and a second directivity function corresponding to the second region;
configuring an objective function based on the first directivity function and the second directivity function;
determining a feeding coefficient of the antenna array based on the objective function; and
forming and transmitting a beam based on the determined feeding coefficient.

2. The method of claim 1, wherein the first region is a region for increasing an intensity of a beam radiated through the antenna array, and the second region is a region for decreasing the intensity of the beam radiated through the antenna array.

3. The method of claim 1, wherein the feeding coefficient includes at least one of a magnitude and a phase of a feeding current corresponding to each of antennas constituting the antenna array.

4. The method of claim 1, wherein the first directivity function is calculated as a radiation intensity in a direction corresponding to the first region with respect to a radiation intensity in all directions, and
wherein the second directivity function is calculated as a radiation intensity in a direction corresponding to the second region with respect to the radiation intensity in the all directions.

5. The method of claim 1, wherein the first directivity function is calculated based on an azimuth angle ($\theta$) and an elevation angle ($\varphi$) corresponding to the first region and the feeding coefficient of the antenna array, and
wherein the second directivity function is calculated based on an azimuth angle ($\theta$) and an elevation angle ($\varphi$) corresponding to the second region and the feeding coefficient of the antenna array.

6. The method of claim 1, wherein the objective function is configured based on a difference between the first directivity function and the second directivity function, and
wherein the feeding coefficient is determined so that the objective function is maximized.

7. The method of claim 1, further comprising:
calculating a first variance function corresponding to the first region and a second variance function corresponding to the second region,
wherein the objective function is configured based on a difference between the first directivity function and a sum of the second directivity function, the first variance function, and the second variance function, and
wherein the feeding coefficient is determined so that the objective function is maximized.

8. The method of claim 1, wherein the feeding coefficient is determined based on a gradient method applied to the objective function.

9. An apparatus for forming a beam of an antenna array, the apparatus comprising:
a transceiver; and
a controller configured to configure a first region and a second region for beam forming, to calculate a first directivity function corresponding to the first region and a second directivity function corresponding to the second region, to configure an objective function based on the first directivity function and the second directivity function, to determine a feeding coefficient of the antenna array based on the objective function, and to form and transmit a beam based on the determined feeding coefficient.

10. The apparatus of claim 9, wherein the first region is a region for increasing an intensity of a beam radiated through the antenna array, and the second region is a region for decreasing the intensity of the beam radiated through the antenna array.

11. The apparatus of claim 9, wherein the feeding coefficient includes at least one of a magnitude and a phase of a feeding current corresponding to each of antennas constituting the antenna array.

12. The apparatus of claim 9, wherein the controller is further configured to:
calculate the first directivity function as a radiation intensity in a direction corresponding to the first region with respect to a radiation intensity in all directions, and
calculate the second directivity function as a radiation intensity in a direction corresponding to the second region with respect to the radiation intensity in the all directions.

13. The apparatus of claim 9, wherein the controller is further configured to:
calculate the first directivity function based on an azimuth angle ($\theta$) and an elevation angle ($\varphi$) corresponding to the first region and the feeding coefficient of the antenna array, and
calculate the second directivity function based on an azimuth angle ($\theta$) and an elevation angle ($\varphi$) corresponding to the second region and the feeding coefficient of the antenna array.

14. The apparatus of claim 9, wherein the controller is further configured to configure the objective function based on a difference between the first directivity function and the second directivity function, and to determine the feeding coefficient so that the objective function is maximized.

15. The apparatus of claim 9, wherein the controller is further configured to:
further calculate a first variance function corresponding to the first region and a second variance function corresponding to the second region, configure the objective function based on a difference between the first directivity function and a sum of the second directivity function, the first variance function, and the second variance function, determine the feeding coefficient so that the objective function is maximized, and
determine the feeding coefficient based on a gradient method applied to the objective function.

* * * * *